US010277959B2

(12) United States Patent
Winograd et al.

(10) Patent No.: US 10,277,959 B2
(45) Date of Patent: *Apr. 30, 2019

(54) SERVICE SIGNALING RECOVERY FOR MULTIMEDIA CONTENT USING EMBEDDED WATERMARKS

(71) Applicant: Verance Corporation, San Diego, CA (US)

(72) Inventors: Joseph M. Winograd, San Diego, CA (US); Rade Petrovic, San Diego, CA (US); Jian Zhao, San Diego, CA (US)

(73) Assignee: Verance Corporation, San Diego, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/464,237

(22) Filed: Mar. 20, 2017

(65) Prior Publication Data

US 2017/0251282 A1    Aug. 31, 2017

Related U.S. Application Data

(63) Continuation of application No. 14/975,297, filed on Dec. 18, 2015, now Pat. No. 9,602,891.

(Continued)

(51) Int. Cl.
*H04N 21/8358* (2011.01)
*G06F 17/30* (2006.01)
(Continued)

(52) U.S. Cl.
CPC ..... *H04N 21/8358* (2013.01); *G06F 17/3079* (2013.01); *H04N 21/23892* (2013.01);
(Continued)

(58) Field of Classification Search
CPC ........... H04N 21/4722; H04N 21/4725; H04N 21/4728
See application file for complete search history.

(56) References Cited

U.S. PATENT DOCUMENTS 6,122,610 A    9/2000 Isabelle
6,145,081 A    11/2000 Winograd et al.
(Continued)

FOREIGN PATENT DOCUMENTS

CN        103533343    1/2014
EP         1474924     11/2004
(Continued)

OTHER PUBLICATIONS

Extended European Search Report dated Nov. 21, 2017 for European Application No. 15785628.7 (7 pages).
(Continued)

*Primary Examiner* — Junior O Mendoza
(74) *Attorney, Agent, or Firm* — Perkins Coie LLP; Donald L. Wenskay

(57) ABSTRACT

Methods, devices, systems and computer program products facilitate accessing metadata associated with a primary audio visual content. Upon reception of a primary content, one or more watermark messages are extracted from the primary content obtain a server code and an interval code. A query to a metadata server is initiated based on the information obtained from the extracted watermark messages. In response to the query, service recovery information is received that includes information identifying one or more timed events, where each timed event identifies an operation to be performed at a corresponding instance in time as the primary content is being presented by the receiver device. One or more operations identified the timed events are initiated at the corresponding instance(s) in time.

28 Claims, 13 Drawing Sheets

Related U.S. Application Data

(60) Provisional application No. 62/093,996, filed on Dec. 18, 2014.

(51) Int. Cl.
  *H04N 21/2389*   (2011.01)
  *H04N 21/262*    (2011.01)
  *H04N 21/858*    (2011.01)
  *H04N 21/462*    (2011.01)
  *H04N 21/4722*   (2011.01)
  H04N 21/4627   (2011.01)

(52) U.S. Cl.
  CPC ..... *H04N 21/262* (2013.01); *H04N 21/26291* (2013.01); *H04N 21/4622* (2013.01); *H04N 21/4722* (2013.01); *H04N 21/8586* (2013.01); H04N 21/4627 (2013.01)

(56) References Cited

U.S. PATENT DOCUMENTS

| | | |
|---|---|---|
| 6,175,627 B1 | 1/2001 | Petrovic et al. |
| 6,411,725 B1 | 6/2002 | Rhoads et al. |
| 6,427,012 B1 | 7/2002 | Petrovic |
| 6,430,301 B1 | 8/2002 | Petrovic |
| 6,490,579 B1 | 12/2002 | Gao et al. |
| 6,577,747 B1 | 6/2003 | Kalker et al. |
| 6,683,958 B2 | 1/2004 | Petrovic |
| 6,721,439 B1 | 4/2004 | Levy et al. |
| 6,792,542 B1 | 9/2004 | Lee et al. |
| 6,839,673 B1 | 1/2005 | Choi et al. |
| 6,888,943 B1 | 5/2005 | Lam et al. |
| 6,895,430 B1 | 5/2005 | Scheider |
| 6,931,536 B2 | 8/2005 | Hollar |
| 7,024,018 B2 | 4/2006 | Petrovic |
| 7,140,043 B2 | 11/2006 | Choi et al. |
| 7,159,118 B2 | 1/2007 | Petrovic |
| 7,224,819 B2 | 5/2007 | Levy et al. |
| 7,343,397 B2 | 3/2008 | Kochanski |
| 7,460,667 B2 | 12/2008 | Lee et al. |
| 7,533,266 B2 | 5/2009 | Bruekers et al. |
| 7,548,565 B2 | 6/2009 | Sull et al. |
| 7,689,532 B1 | 3/2010 | Levy |
| 7,707,422 B2 | 4/2010 | Shin et al. |
| 7,774,834 B1 | 8/2010 | Chauhan et al. |
| 7,779,271 B2 | 8/2010 | Langelaar |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,081,757 B2 | 12/2011 | Voessing et al. |
| 8,085,935 B2 | 12/2011 | Petrovic |
| 8,103,049 B2 | 1/2012 | Petrovic et al. |
| 8,138,930 B1 | 3/2012 | Heath |
| 8,151,113 B2 | 4/2012 | Rhoads |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,259,873 B2 | 9/2012 | Baum et al. |
| 8,280,103 B2 | 10/2012 | Petrovic et al. |
| 8,301,893 B2 | 10/2012 | Brundage |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,467,717 B2 | 6/2013 | Croy et al. |
| 8,479,225 B2 | 7/2013 | Covell et al. |
| 8,483,136 B2 | 7/2013 | Yuk et al. |
| 8,533,481 B2 | 9/2013 | Petrovic et al. |
| 8,538,066 B2 | 9/2013 | Petrovic et al. |
| 8,560,604 B2 | 10/2013 | Shribman et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic et al. |
| 8,666,528 B2 | 3/2014 | Harkness et al. |
| 8,682,026 B2 | 3/2014 | Petrovic et al. |
| 8,726,304 B2 | 5/2014 | Petrovic et al. |
| 8,745,403 B2 | 6/2014 | Petrovic |
| 8,768,714 B1 | 7/2014 | Blesser |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,825,518 B2 | 9/2014 | Levy |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,898,720 B2 | 11/2014 | Eyer |
| 8,923,548 B2 | 12/2014 | Petrovic et al. |
| 8,959,202 B2 | 2/2015 | Haitsma et al. |
| 8,990,663 B2 | 3/2015 | Liu et al. |
| 9,009,482 B2 | 4/2015 | Winograd |
| 9,042,598 B2 | 5/2015 | Ramaswamy et al. |
| 9,055,239 B2 | 6/2015 | Tehranchi et al. |
| 9,106,964 B2 | 8/2015 | Zhao |
| 9,117,270 B2 | 8/2015 | Wong et al. |
| 9,147,402 B2 | 9/2015 | Chen et al. |
| 9,277,183 B2 | 3/2016 | Eyer |
| 9,596,521 B2 | 3/2017 | Winograd et al. |
| 9,602,891 B2 * | 3/2017 | Winograd .......... G06F 17/3079 |
| 9,607,131 B2 | 3/2017 | Winograd et al. |
| 2002/0032864 A1 | 3/2002 | Rhoads et al. |
| 2002/0059622 A1 | 5/2002 | Grove et al. |
| 2002/0078233 A1 | 6/2002 | Biliris et al. |
| 2002/0138695 A1 | 9/2002 | Beardsley et al. |
| 2003/0012403 A1 | 1/2003 | Rhoads et al. |
| 2003/0055979 A1 | 3/2003 | Cooley |
| 2003/0065739 A1 | 4/2003 | Shnier |
| 2003/0084294 A1 | 5/2003 | Aoshima et al. |
| 2003/0103645 A1 | 6/2003 | Levy |
| 2003/0193616 A1 | 10/2003 | Baker et al. |
| 2003/0228030 A1 | 12/2003 | Wendt |
| 2004/0039914 A1 | 2/2004 | Barr et al. |
| 2004/0098370 A1 | 5/2004 | Garland et al. |
| 2004/0101160 A1 | 5/2004 | Kunisa |
| 2004/0250080 A1 | 12/2004 | Levy et al. |
| 2005/0182792 A1 | 8/2005 | Israel et al. |
| 2006/0047704 A1 | 3/2006 | Gopalakrishnan |
| 2006/0053292 A1 | 3/2006 | Langelaar |
| 2006/0062426 A1 | 3/2006 | Levy et al. |
| 2006/0083242 A1 | 4/2006 | Pulkkinen |
| 2006/0115108 A1 | 6/2006 | Rodriguez et al. |
| 2006/0239501 A1 | 10/2006 | Petrovic et al. |
| 2007/0003103 A1 | 1/2007 | Lemma et al. |
| 2007/0039018 A1 | 2/2007 | Saslow et al. |
| 2007/0071037 A1 | 3/2007 | Abraham et al. |
| 2007/0135084 A1 | 6/2007 | Ido et al. |
| 2007/0208744 A1 | 9/2007 | Krishnaprasad et al. |
| 2007/0250560 A1 | 10/2007 | Wein et al. |
| 2008/0002854 A1 | 1/2008 | Tehranchi et al. |
| 2008/0037825 A1 | 2/2008 | Lofgren et al. |
| 2008/0263612 A1 | 10/2008 | Cooper |
| 2008/0297654 A1 | 12/2008 | Verberkt et al. |
| 2008/0301304 A1 | 12/2008 | Chitsaz et al. |
| 2009/0060055 A1 | 3/2009 | Blanchard et al. |
| 2009/0089078 A1 | 4/2009 | Bursey |
| 2009/0158318 A1 | 6/2009 | Levy |
| 2009/0319639 A1 | 12/2009 | Gao et al. |
| 2010/0023489 A1 | 1/2010 | Miyata et al. |
| 2010/0054531 A1 | 3/2010 | Kogure et al. |
| 2010/0063978 A1 | 3/2010 | Lee et al. |
| 2010/0097494 A1 | 4/2010 | Gum et al. |
| 2010/0111355 A1 | 5/2010 | Petrovic et al. |
| 2010/0131461 A1 | 5/2010 | Prahlad et al. |
| 2010/0172540 A1 | 7/2010 | Davis et al. |
| 2010/0174608 A1 | 7/2010 | Harkness et al. |
| 2010/0281142 A1 | 11/2010 | Stoyanov |

(56) References Cited

U.S. PATENT DOCUMENTS

| | | |
|---|---|---|
| 2010/0325646 A1 | 12/2010 | Alhadeff et al. |
| 2011/0058188 A1 | 3/2011 | Guo et al. |
| 2011/0088075 A1 | 4/2011 | Eyer |
| 2011/0099594 A1 | 4/2011 | Chen et al. |
| 2011/0103444 A1 | 5/2011 | Baum et al. |
| 2011/0161086 A1 | 6/2011 | Rodriguez |
| 2011/0164784 A1 | 7/2011 | Grill et al. |
| 2011/0188700 A1 | 8/2011 | Kim et al. |
| 2011/0252342 A1 | 10/2011 | Broman |
| 2011/0261667 A1 | 10/2011 | Ren et al. |
| 2011/0281574 A1 | 11/2011 | Patel et al. |
| 2011/0286625 A1 | 11/2011 | Petrovic et al. |
| 2011/0293090 A1 | 12/2011 | Ayaki et al. |
| 2011/0307545 A1 | 12/2011 | Bouazizi |
| 2011/0320627 A1 | 12/2011 | Landow et al. |
| 2012/0023595 A1 | 1/2012 | Speare et al. |
| 2012/0063635 A1 | 3/2012 | Matsushita et al. |
| 2012/0072731 A1 | 3/2012 | Winograd et al. |
| 2012/0102304 A1 | 4/2012 | Brave |
| 2012/0110138 A1 | 5/2012 | Zhang |
| 2012/0113230 A1 | 5/2012 | Jin |
| 2012/0117031 A1 | 5/2012 | Cha et al. |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0007790 A1 | 1/2013 | McMillan et al. |
| 2013/0024894 A1 | 1/2013 | Eyer |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0077699 A1 | 3/2013 | Gifford et al. |
| 2013/0097625 A1* | 4/2013 | Thorwirth ......... G06F 17/30038 725/25 |
| 2013/0114848 A1 | 5/2013 | Petrovic et al. |
| 2013/0117571 A1 | 5/2013 | Petrovic et al. |
| 2013/0129303 A1 | 5/2013 | Lee et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0159546 A1 | 6/2013 | Thang et al. |
| 2013/0171926 A1 | 7/2013 | Distribeo |
| 2013/0188923 A1 | 7/2013 | Hartley et al. |
| 2013/0205315 A1* | 8/2013 | Sinha ............... G06T 1/0021 725/14 |
| 2013/0227293 A1 | 8/2013 | Leddy et al. |
| 2013/0246643 A1 | 9/2013 | Luby et al. |
| 2013/0271657 A1 | 10/2013 | Park et al. |
| 2014/0037132 A1 | 2/2014 | Heen et al. |
| 2014/0047475 A1 | 2/2014 | Oh et al. |
| 2014/0059116 A1 | 2/2014 | Oh et al. |
| 2014/0059591 A1 | 2/2014 | Terpstra et al. |
| 2014/0067950 A1 | 3/2014 | Winograd |
| 2014/0068686 A1 | 3/2014 | Oh et al. |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0114456 A1 | 4/2014 | Stavropoulos et al. |
| 2014/0115644 A1 | 4/2014 | Kim et al. |
| 2014/0130087 A1 | 5/2014 | Cho et al. |
| 2014/0142958 A1 | 5/2014 | Sharma et al. |
| 2014/0149395 A1 | 5/2014 | Nakamura et al. |
| 2014/0196071 A1 | 7/2014 | Terpstra et al. |
| 2014/0219495 A1 | 8/2014 | Hua |
| 2014/0267907 A1 | 9/2014 | Downes et al. |
| 2014/0270337 A1 | 9/2014 | Zhao et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2015/0030200 A1 | 1/2015 | Petrovic et al. |
| 2015/0043728 A1 | 2/2015 | Kim et al. |
| 2015/0043768 A1 | 2/2015 | Breebaart |
| 2015/0052571 A1 | 2/2015 | Stokking et al. |
| 2015/0063659 A1 | 3/2015 | Poder et al. |
| 2015/0093016 A1 | 4/2015 | Jiang et al. |
| 2015/0121534 A1 | 4/2015 | Zhao et al. |
| 2015/0170661 A1 | 6/2015 | Srinivasan |
| 2015/0229979 A1 | 8/2015 | Wood et al. |
| 2015/0261753 A1 | 9/2015 | Winograd et al. |
| 2015/0264429 A1 | 9/2015 | Winograd et al. |
| 2015/0296274 A1 | 10/2015 | Good et al. |
| 2015/0324947 A1 | 11/2015 | Winograd et al. |
| 2015/0340045 A1 | 11/2015 | Hardwick et al. |
| 2016/0037189 A1 | 2/2016 | Holden et al. |
| 2016/0055606 A1 | 2/2016 | Petrovic et al. |
| 2016/0055607 A1 | 2/2016 | Petrovic et al. |
| 2016/0057317 A1 | 2/2016 | Zhao et al. |
| 2016/0148334 A1 | 5/2016 | Petrovic et al. |
| 2016/0150297 A1 | 5/2016 | Petrovic et al. |
| 2016/0182973 A1 | 6/2016 | Winograd et al. |
| 2016/0241932 A1 | 8/2016 | Winograd et al. |
| 2017/0272839 A1 | 9/2017 | Winograd et al. |
| 2017/0280205 A1 | 9/2017 | Winograd et al. |
| 2017/0374434 A1 | 12/2017 | Petrovic et al. |
| 2018/0018748 A1 | 1/2018 | Petrovic et al. |

FOREIGN PATENT DOCUMENTS

| | | |
|---|---|---|
| EP | 2439735 | 4/2012 |
| EP | 2489181 | 8/2012 |
| EP | 2899720 | 7/2015 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 10201016712 | 2/2011 |
| KR | 1020120083903 | 7/2012 |
| KR | 1020120128149 | 11/2012 |
| KR | 20130078663 | 7/2013 |
| KR | 1020130074922 | 7/2013 |
| KR | 101352917 | 1/2014 |
| KR | 10201424049 | 7/2014 |
| WO | 9803014 | 1/1998 |
| WO | WO 2000059148 | 10/2000 |
| WO | WO 2005017827 | 2/2005 |
| WO | WO 2005038778 | 4/2005 |
| WO | WO 2006051043 | 5/2006 |
| WO | WO 2008045880 | 4/2008 |
| WO | WO 2009031082 | 3/2009 |
| WO | WO 2010073236 | 7/2010 |
| WO | WO 2010135687 | 11/2010 |
| WO | WO 2011046590 | 4/2011 |
| WO | WO 2011116309 | 9/2011 |
| WO | WO 2012177126 | 12/2012 |
| WO | WO 2012177874 | 12/2012 |
| WO | WO 2013025035 | 2/2013 |
| WO | 2013067439 | 5/2013 |
| WO | WO 2013163921 | 11/2013 |
| WO | WO 2014014252 | 1/2014 |
| WO | WO 2015138798 | 9/2015 |
| WO | WO 2015168697 | 11/2015 |
| WO | WO 2015174086 | 11/2015 |
| WO | WO 2016028934 | 2/2016 |
| WO | WO 2016028936 | 2/2016 |

(56) References Cited

FOREIGN PATENT DOCUMENTS

| WO | WO 2016029055 | 2/2016 |
|----|---------------|--------|
| WO | WO 2016086047 | 6/2016 |

OTHER PUBLICATIONS

Partial Supplementary European Search Report dated Feb. 23, 2018 for European Application No. 15833725.3 (12 pages).
Extended European Search Report dated Feb. 23, 2018 for European Application No. 15833741.0 (8 pages).
"ATSC-3.0 Automatic Content Recognition Watermarking Solutions," ATSC Technology Group, Advanced Television Systems Committee, Inc., Jan. 2014 (6 pages).
ARIS Technologies, Inc. "Audio Watermarking System to Screen Digital Audio Content for LCM Acceptance," May 1999 (17 pages).
Bangaleea, R., et al., "Performance improvement of spread spectrum spatial-domain watermarking scheme through diversity and attack characterisation," *IEEE Africon*, pp. 293-298, 2002.
Extended European Search Report dated Sep. 21, 2017 for European Application No. 15762332.3 (9 pages).
Furon, T., "A constructive and unifying framework for zero-bit watermarking," CS.MM, Jan. 12, 2007.
Hartung, F., et al., "Watermarking of MPEG-2 encoded video without decoding and re-coding," *Proc. SPIE Multimedia Computing and Networking* 97, 3020:264-274, Feb. 1997.
Hartung, F., et al., "Watermarking of uncompressed and compressed video," *Signal Processing*, 3(66):283-301, May 1998.
International Search Report and Written Opinion dated Apr. 12, 2016 for International Application No. PCT/US2015/066872, filed Dec. 18, 2015 (7 pages).
International Search Report and Written Opinion dated Aug. 13, 2015 for International Application No. PCT/US2015/029097, filed May 4, 2015 (14 pages).
International Search Report and Written Opinion dated Dec. 7, 2015 for International Application No. PCT/US2015/045960, filed Aug. 19, 2015 (14 pages).
International Search Report and Written Opinion dated Jan. 21, 2016 for International Application No. PCT/US2015/046166, filed Aug. 20, 2015 (8 pages).
International Search Report and Written Opinion dated Jan. 28, 2016 for International Application No. PCT/US2015/045964, filed Aug. 19, 2015 (8 pages).
International Search Report and Written Opinion dated Mar. 15, 2016 for International Application No. PCT/US2015/062514, filed Nov. 24, 2015 (10 pages).
International Search Report and Written Opinion dated May 28, 2015 for International Application No. PCT/US2015/020282, filed Mar. 12, 2015 (7 pages).
Kalker, T., et al., "System issues in digital image and video watermarking for copy protection," *Proc. IEEE Int. Conf. on Multimedia Computing and Systems*, pp. 562-567, Jun. 1999.
Kirovski, D., et al., "Multimedia content screening using a dual watermarking and fingerprinting system," *Proceedings of the tenth ACM international conference*, pp. 372-381, 2002.
Kirovski, D., et al., "Multimedia content screening using a dual watermarking and fingerprinting system," *Multimedia '02 Proceedings of the tenth ACM international conference on Multimedia*, 2002 (11 pages).
Office Action dated Jul. 28, 2016 for Korean Patent Application No. 10-2016-7002289 (11 pages).
Office Action dated Jun. 10, 2016 for Korean Patent Application No. 10-2016-7002291 (19 pages).
Office action dated Nov. 30, 2016 for Korean Patent Application No. 10-2016-7002289 (4 pages).
Verance Corporation, "Confirmedia," PowerPoint presentation made to National Association of Broadcasters, Apr. 24, 2001 (40 pages).
Zhao, J., "A WWW service to embed and prove digital copyright watermarks," *Proc. European Conf. on Multimedia Applications, Services and Techniques (ECMAST'96)*, May 1996 (15 pages).
Zhao, J., "Applying digital watermarking techniques to online multimedia commerce," *Proc. Int. Conf. on Imaging Science, Systems and Applications (CISSA'97)*, Jun./Jul. 1997 (7 pages).

* cited by examiner

SERVICE SIGNALING RECOVERY FOR MULTIMEDIA CONTENT USING EMBEDDED WATERMARKS

CROSS REFERENCE TO RELATED APPLICATIONS

This patent application is a continuation of U.S. patent application Ser. No. 14/975,297, filed on Dec. 18, 2015, which claims the benefit of priority of U.S. Provisional Patent Application No. 62/093,996, filed Dec. 18, 2014. The entire contents of the before-mentioned patent applications are incorporated by reference as part of the disclosure of this application.

TECHNICAL FIELD

The subject matter of this patent document relates to management of multimedia content and more specifically to facilitate access and delivery of metadata, programs and services associated with a multimedia content based on watermarking techniques.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia content, such as an audio-visual content, can include a series of related images, which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, etc.

In some scenarios, such a multimedia content, or portions thereof, may contain only one type of content, including, but not limited to, a still image, a video sequence and an audio clip, while in other scenarios, the multimedia content, or portions thereof, may contain two or more types of content such as audiovisual content and a wide range of metadata. The metadata can, for example include one or more of the following: channel identification, program identification, content and content segment identification, content size, the date at which the content was produced or edited, identification information regarding the owner and producer of the content, timecode identification, copyright information, closed captions, and locations such as URLs where advertising content, software applications, interactive services content, and signaling that enables various services, and other relevant data that can be accessed. In general, metadata is the information about the content essence (e.g., audio and/or video content) and associated services (e.g., interactive services, targeted advertising insertion).

Such metadata is often interleaved, prepended or appended to a multimedia content, which occupies additional bandwidth, can be lost when content is transformed into a different format (such as digital to analog conversion, transcoded into a different file format, etc.), processed (such as transcoding), and/or transmitted through a communication protocol/interface (such as HDMI, adaptive streaming). Notably, in some scenarios, an intervening device such as a set-top box issued by a multichannel video program distributor (MVPD) receives a multimedia content from a content source and provides the uncompressed multimedia content to a television set or another presentation device, which can result in the loss of various metadata and functionalities such as interactive applications that would otherwise accompany the multimedia content. Therefore alternative techniques for content identification can complement or replace metadata multiplexing techniques.

BRIEF DESCRIPTION OF THE DRAWINGS

FIG. 9 (B) is another simplified diagram of a content timeline, and associated advertisements and interactive content that are presented in a nested configuration.

FIG. 9 (C) is another simplified diagram of a content timeline, and associated advertisements and interactive content that are presented in a different nested configuration.

SUMMARY OF CERTAIN EMBODIMENTS

Figure 1:
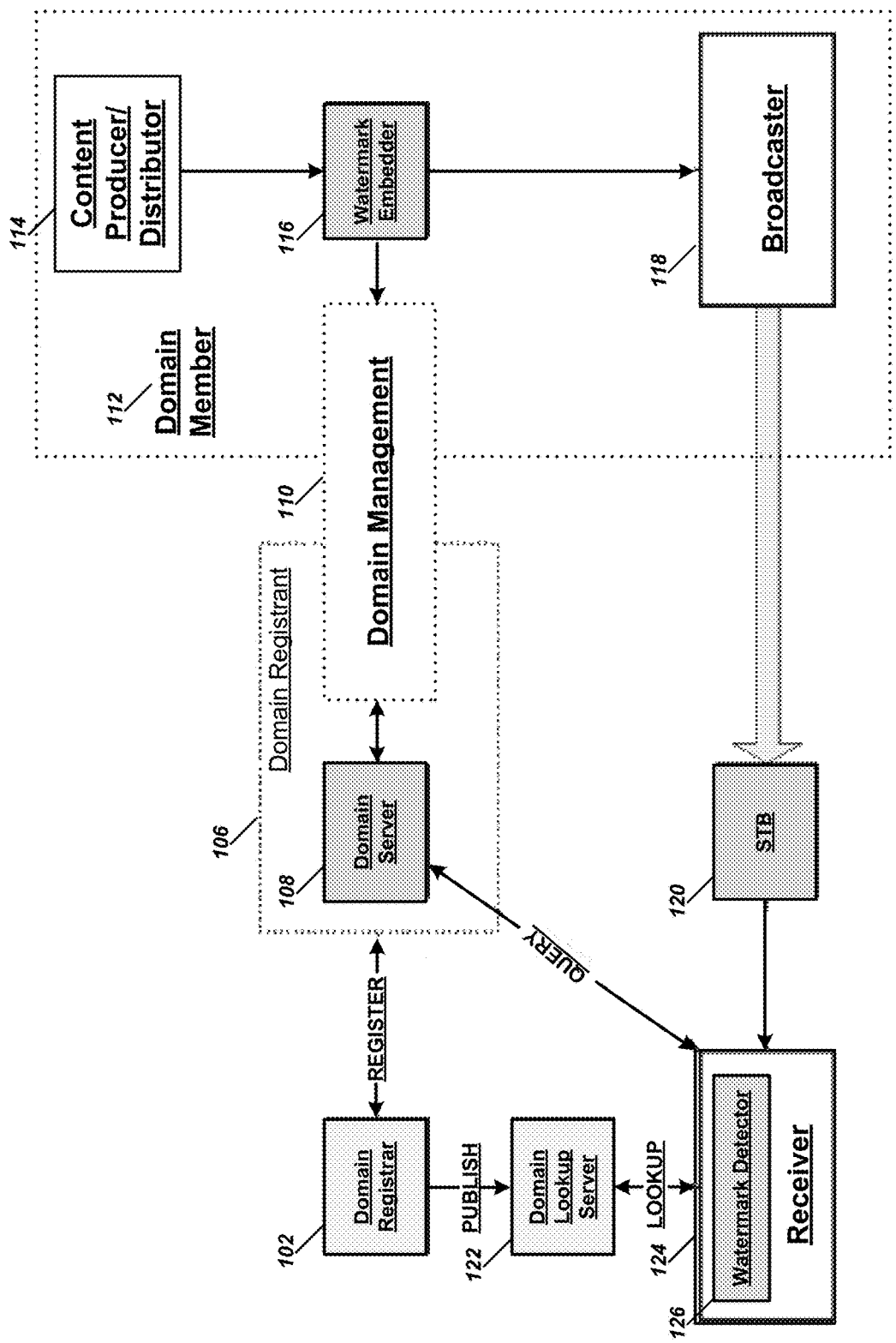
FIG. 1 illustrates a system for providing automatic content recognition and acquisition of metadata in accordance with an exemplary embodiment.

The disclosed technology relates to methods, devices, systems and computer program products that enable recovery of lost metadata associated with a primary content, and enable presentation of interactive services and advertisements at specified time instances.

One aspect of the disclosed embodiments relates to a method for acquiring information related to a primary content that includes accessing a primary content at a receiver device, and extracting one or more watermark messages that are embedded in the primary content to obtain a server code and an interval code. The one or more watermark messages are extracted using a watermark detector. This method further includes initiating a query to a metadata server based on information extracted from the one or more watermark messages, and receiving service recovery information at the receiver device. The service recovery information includes information that identifies one or more timed events, where each timed event identifies an operation to be performed at a corresponding instance in time as the primary content is being presented by the receiver device. The above noted method further includes initiating one or more operations identified by the one or more timed events at the corresponding instance(s) in time.

DETAILED DESCRIPTION

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Service signaling is information included in a broadcast service other than the main audiovisual program material which enables execution of a service function such as interactive services and targeted ads insertion. It can provide descriptive information about programming and associated services and program timing information that is important to enable targeted advertising.

However, as noted earlier, service signaling can be lost or not accurately recovered at a downstream device after content redistribution and/or processing. For example, a program can be distributed via a transmission interface or protocol, such as HDMI, DVI, DLNA (Digital Living Network Alliance), DASH (Dynamic Adaptive Streaming over HTTP), through which not all service signaling associated with the program is transmitted from an upstream device (e.g., a cable set-top box or home gateway) to a downstream device (e.g., a TV). As another example, the service signaling may not preserved by all transcoders. Transcoding may be needed due to audio or video format or codec incompatibility. For example, an in-home device (such as a tablet or a TV) that receives redistributed content from a home gateway may not support advanced codecs such as HEVC used for encoding the original video streams received by the home gateway from an multichannel video program distributor (MVPD). In another case, transcoding may be needed for various distribution protocols such as Real-time Transport Protocol (RTP), Dynamic Adaptive Streaming over HTTP (DASH) or HTTP Live Streaming (HLS), which are used by the home gateway for content redistribution.

To mitigate the issues that can arise from the loss of content metadata that are carried in separate metadata channels is to embed watermarks into the content to enable automatic content recognition (ACR) and metadata recovery. Watermarks can be embedded in the audio and/or video portions of a content and are substantially imperceptible to a viewer (or listener) of the content. Properly designed watermarks can be immune to various content processing operations and channel impairments, such as compression and decompression, cropping, scaling, transcoding, format conversion, noise addition, acoustic propagation, optical (e.g., free space) transmission, digital-to-analog (D/A) and analog-to-digital (A/D) conversions and the like.

Once the embedded watermarks are detected by a watermark detector (also sometimes referred to as a watermark extractor), the payload of the watermark can be used to identify the content and recover the metadata associated with the identified content. In ACR applications, watermarks are often designed with a set of requirements that differ from requirements that are imposed on other watermark detectors, such as copy control watermark detectors. For example, in ACR applications it is critical to be able to recognize a content very quickly. After a content is recognized, the associated metadata can be recovered to enable various operations, such as receiving an additional content, performing dynamic advertising insertion, or participating in an interactive opportunity. Further, the viewing device (or an associated device) can be connected to the Internet (or more generally, to a remote database) for the retrieval of the additional content, for participating in the interactive opportunities or other services.

FIG. 1 illustrates a system for providing automatic content recognition for content that is provided by a broadcaster or redistributor to a consumer device and acquisition of interactive content that can be used for accommodating the disclosed embodiments. The system of FIG. 1 is one example of an ecosystem that can accommodate, and benefit from, the disclosed techniques. The system of FIG. 1 is compatible with the requirements of the Advanced Television Systems Committee (ATSC), Inc., Call for Proposals For ATSC-3.0 AUTOMATIC CONTENT RECOGNITION WATERMARKING SOLUTIONS—ATSC Technology Group 3 (ATSC 3.0) (S33 Doc. 067r3). It is understood, however, that the use of the system in FIG. 1 is not strictly limited to ATSC technologies, and such a system can enable access to a metadata associated with a content for non-ATSC technologies, as well.

In FIG. 1, the content is embedded with watermarks using a watermark embedder 116 by a Domain Member 112 prior to broadcast. For example, such a Domain Member 112 can be a content producer 114 or a Broadcaster 118. A Broadcaster 118 (which can also be called a Redistributor) transmits the content to one or more user premises. Such content is often received at a Receiver 124 such as a set top box (STB) 120, where decompression and formatting operations may take place before the content is provided (typically via a HDMI interface) to a viewing device, which is sometimes referred to as the "Receiver" or the "Receiver Device" 124. Such a Receiver 124 can be compliant with the ATSC 3.0 standard. Decompression and formatting may alternatively take place within the Receiver 124. The Receiver 124 which includes a watermark detector 126, examines the received content for the presence of watermarks. The detection of watermarks may trigger further actions such as identifying a domain name associated with the detected watermark payload and sending a query to an identified Domain Server 108. Such a Receiver 124 can operate as a client device which is communicatively connected to one or more servers and/or other client devices.

It should be noted that while in some implementations, the Receiver 124 is a separate component than the set-top box 120, in other implementations the Receiver 124 may include, or be part of a larger device that includes, any one or combinations of additional components such as a set-top box 120, a display, keyboard or other user interface devices, or a watermark detector 126, as well as processors (e.g., microprocessors, digital signal processors (DSPs), etc.) and other circuitry that may be needed for implementation of such device, or devices.

The watermark structure in some exemplary embodiments includes the following fields: a Domain ID and a Sequence ID. Each Domain ID is assigned by a central authority to a Domain Registrant 106 who controls assignment and use of the Sequence ID codes under that domain. Each Domain ID maps one-to-one to an Internet domain name which is used to retrieve metadata associated with Sequence IDs in that domain. The Domain Registrar 102 in FIG. 1 is a unique centralized entity responsible for registering such Domain IDs and publishing the mapping between the Domain IDs and domain names to Domain Lookup Servers 122. Domain registration is a process wherein a Domain ID is uniquely assigned to a Domain Registrant 106 entity. The Domain Registrar 102 provides Domain Registrant 106 with a process (e.g., designated as REGISTER in FIG. 1) to establish and maintain the relationship between the Domain ID and a domain name (e.g., Internet format). Multiple Domain IDs may be mapped to the same domain name. The Domain Registrar 102 further maintains a database of all mappings from Domain IDs to domain names. The Domain Registrar 102 employs a standardized protocol (e.g., designated as PUBLISH in FIG. 1) to publish new and modified domain mappings to Domain Lookup Services that can include Domain Lookup Servers 122, as well as any other devices that may be needed to implement Domain Lookup Services. This protocol used by the Domain Registrar 102 enables interoperability between the central Domain Registrar 102 and all Domain lookup services. In some implementations, support for PUBLISH protocol is mandatory on both the Domain Lookup Servers 122 and the Domain Registrar 102.

Domain Lookup Server(s) 122 maintain a copy of the Domain Registration database which maps each registered Domain ID to a domain name and keeps it current using the PUBLISH protocol with the Domain Registrar 102. Domain Lookup Server(s) 122 also employ a standardized protocol (e.g., designated as LOOKUP in FIG. 1) to provide domain name mappings from the database in response to Domain ID lookup queries originated by the Receivers 124. The use of a standardized LOOKUP protocol allows interoperability between any Receiver 124 and any Domain Lookup Server 122. In some embodiments the Receivers 124 are ATSC-compatible or ATSC-complaint. That is, those Receivers 124 comply with ATSC requirements, such as those under ATSC 3.0.

Domain Servers 108 can be Internet servers that are accessible at the domain name associated with a registered Domain ID and can provide metadata to Receivers 124 in response to queries triggered by watermark detections. In some implementations, queries employ a standardized message protocol (e.g., designated as QUERY in FIG. 1). A query is initiated by a Receiver 124 and provides the Domain Server 108 with a Domain ID and Sequence ID. The Domain Server 108 responds with available metadata (e.g. broadcast channel identifier, a broadcast segment identifier, a timecode, a signaling) associated with the provided Domain ID and Sequence ID. Domain Servers 108 are not required to provide data for all required data fields available for all queries. In some embodiments, support for the QUERY protocol is mandatory on all Receivers 124 and Domain Servers 108 in order to enable interoperability among all Receivers 124 and content. This protocol enables interoperability between all Receivers 124 and all Domain Servers 108 and support may be mandatory on both the Receivers 124 and the Domain Servers 108.

Domains are managed via coordinated interaction between a Domain Registrant 106 and Domain Members 112 (entities within a domain). Domain Management 110 includes allocation of Sequence IDs within the domain to Domain Members 112, assignment of Sequence IDs to content segments, management of Sequence ID usage by watermark embedders 116, and/or distribution of metadata associated with Sequence IDs to Domain Servers 108. Standardization of protocols or processes for these functions may be valuable to obtain interoperability of professional systems, but is not essential for interoperability of devices. Domain Management 110 may include analysis of the digital broadcast stream which contains both audiovisual broadcast content and multiplexed digital metadata to decode both watermarks and embedded digital metadata and automatically establish the association between watermark payloads present in the audio and video essence of the broadcast content and digital metadata present and associated with the same essence in the broadcast stream for population of the Domain Servers 108. Domain Management 110 may also include functions, devices and interfaces that allow Broadcasters 118 or Content Producers 114 to edit the metadata extracted from the broadcast content or add new metadata for population of the Domain Servers 108.

In one example implementation, a 50-bit payload can be embedded in every 1.5 seconds of the content. In this example, the watermark payload can be standardized with the following structure: [Payload Type:2] [Payload:48]. That is, the right-most 48 bits are designated to carry the payload and the 2 left-most bits are designated to carry the Payload Type. For example, the Payload Type values can be in the range 0 to 3, where a "0" designates a Reserved payload type, a "1" designate a Large Domain payload type, a "2" designates a Medium Domain payload type, and a "3" designates a Small Domain payload type. The payload type values can thus each describe the structure of the payload.

The Domain field from any structure can be mapped into a unique Domain ID by prepending the Payload Type value to the Domain field and zero-padding (on the right) to 32 bits. For ASCII encoding, the Domain ID can be represented as an 8-character hexadecimal value. Domain field value of 0 can be reserved in all domains. The Sequence field from any structure can be mapped directly into a Sequence ID. For ASCII encoding, hexadecimal representation of the Sequence field (leading zeroes optional) can be utilized. Sequence IDs with decimal value of 1024 or less can be reserved for use as Control Codes. Control Codes are currently reserved.

The trigger bit, when set (e.g. to a value of "1"), can inform the Receiver 124 of an event that may activate the Receiver 124 to perform various operations such as requesting metadata from the Domain Server 108. It can indicate that further services or features, such as interactive content or advertising insertion associated with the Sequence ID is available to the Receiver 124 from the Domain Server 108 associated with the payload's Domain ID. In some implementations the trigger field can include multiple bits.

The watermark payload can undergo various coding, modulation and formatting operations before being embedded into a content. For example, the payload may be error correction code (ECC) encoded, scrambled, interleaved with other packets, appended with a synchronization or registration header, encrypted or channel coded to form a sequence of bits with particular characteristics. Once embedded into a host content, the embedded host content can be processed by a watermark extractor to recover the embedded watermark bits (or, more generally, symbols), and perform the reverse of the above coding, modulation or formatting schemes to recover the payload. In some instances, statistical techniques are used to recover the embedded symbols from the content using multiple instances of embedded watermarks.

Figure 2:
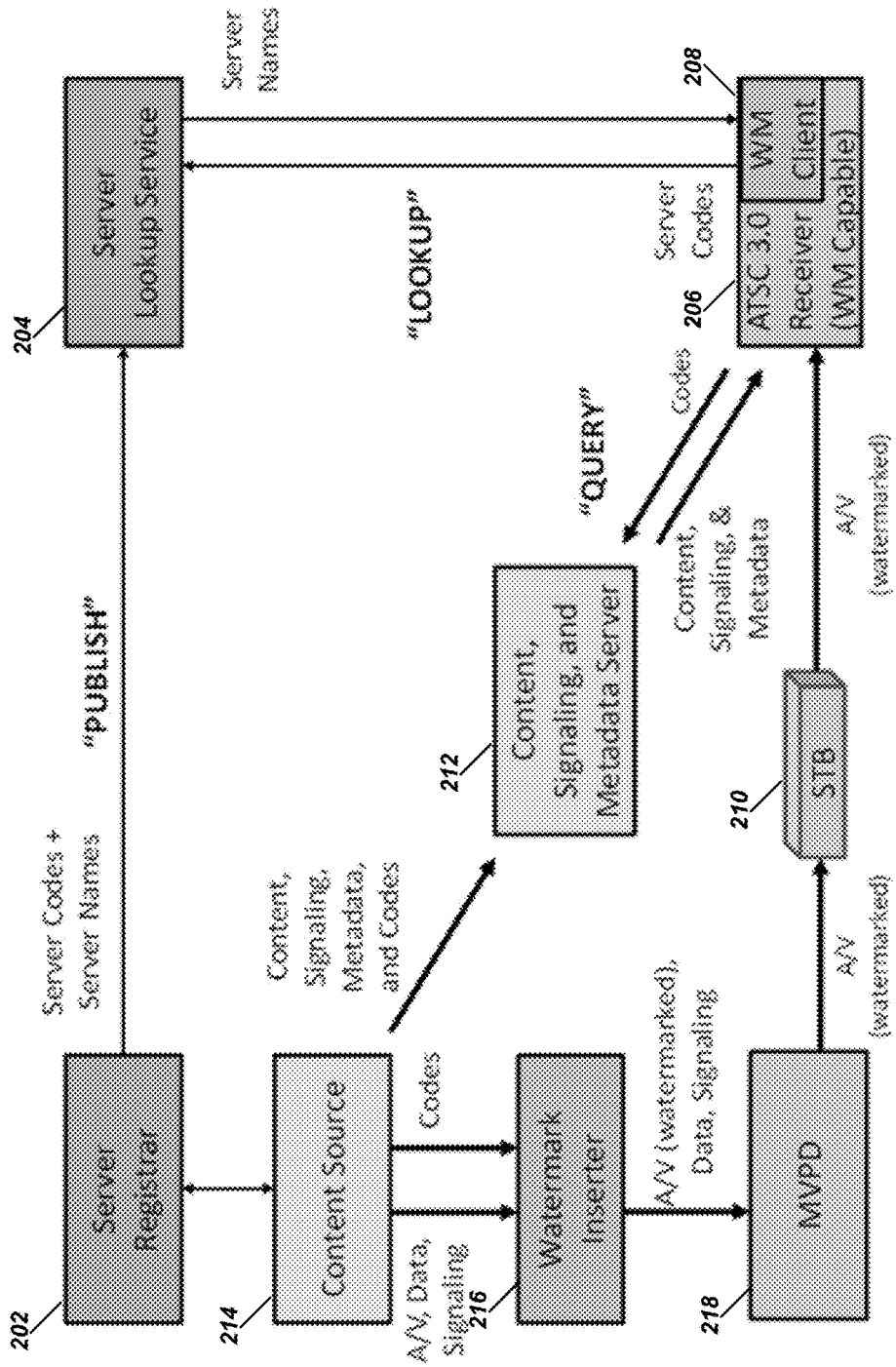
FIG. 2 illustrates another system and associated components that enables automatic content recognition and acquisition of corresponding metadata in accordance with an exemplary embodiment.

FIG. 2 provides another exemplary system that can accommodate, and benefit from, the disclosed embodiments, while conforming to ACR requirements of ATSC 3.0. It is understood, however, that the use of the system in FIG. 2 is not strictly limited to ATSC technologies, and such a system can enable access to a metadata associated with a content for non-ATSC technologies, as well. Several components that are shown in FIG. 2 can find analogous counterparts in FIG. 1. For example, the Server Registrar 202 and the Domain Registrar 102; the Content, Signaling and Metadata Server 212 and Domain Server 108; and the Server Lookup Service/Server 204 and Domain Lookup Server 122 can carry out analogous operations. The various components in FIG. 2 are further described below. A Server Registrar 202 is established by ATSC for the purpose of registering ATSC Domains and assigning to each a unique Server Code. Registrants inform the Registrar of a Server Name, which is the Internet domain name or URL at which metadata services associated with the Code Domain are located. The Server Registrar publishes the Server Code and associated Server Name to the Server Lookup Services 204.

One or more Server Lookup Services are established. These services may be operated by ATSC, the Server Registrar 202, Content Owners, ATSC Receiver manufacturers, or a third party. Each Server Lookup Service 204 maintains a database of all Server Code/Server Name associations published by the Server Registrar 202 and responds to lookup requests from ATSC Receivers 206. The Server Lookup Services 204 do not need to access or store any broadcast metadata; they simply provide ATSC Receivers 206 with access to Server Names associated with Server Codes detected from broadcast watermarks.

A Content Source 214, acting either as a Server Registrant or in concert with a Server Registrant, associates a valid registered Server Code and one or more unique Interval Codes and maps them to intervals of broadcast content essence. The Content Source 214 embeds those codes in the broadcast content using a Watermark Inserter 216 prior to delivery of the broadcast content to an MVPD 218 via, in some instances a set top box (STB) 210. The Sever Code can be analogous to the Sequence ID described in the exemplary watermark payload above.

The Interval Codes and the metadata for those same intervals of broadcast essence (e.g. any interactive content, signaling, metadata, triggers, channel identifier, media timeline timecode, etc.) are associated together in a database which is provided to a Content, Signaling, and Metadata Server ("CSM Server") 212. Content Sources 214 may associate and embed watermarks continuously throughout their program material using sequentially increasing Interval Codes (e.g., analogous the Sequence ID described in the exemplary watermark payload above), may embed watermarks only in those intervals of content where interactive services are enabled, or may embed an Interval Code repeatedly through a program segment where an interactive service is available but does not require timing precision. Content Sources 214 may register additional Code Domains in advance of depleting the Interval Code space associated with a given Server Code and may associate newly assigned Server Codes with the same Internet domain name to maintain infrastructure continuity.

The CSM Server 212 responds to various requests from ATSC Receivers 206, including delivery of signaling and interactive content based on interactive service data received from a complete broadcast stream. The CSM Server 212 also responds to code metadata queries, in which a query containing the watermark payload (e.g. in the ASCII representational format) is submitted by the WM Client 208 in an ATSC Receiver 206, with a request for metadata associated with the interval of broadcast content. The metadata included in the response provided by the CSM Server 212 may include channel identifiers, timecodes, content or segment identifiers, triggers, etc. It should be noted that while metadata services can be hosted in the same servers as the content and signaling services, they may alternatively be hosted on different servers from those used for content and signaling services.

To enable the architecture that is depicted in FIG. 2, open standards can be provided for the following three network protocols: PUBLISH, LOOKUP, and QUERY.

PUBLISH is a protocol whereby the Server Registrar 202 notifies interested ecosystem participants of a newly established or updated mapping between a Server Code and an Internet domain name and publishes the association to Server Lookup Services 204.

LOOKUP is a protocol whereby an ATSC Receiver 206 can submit a Server Code to a Server Lookup Service 204 and receive a response containing the associated Server Name which has been most recently published by the Server Registrar 202.

QUERY is a protocol whereby an ATSC Receiver 206 can submit a Server Code and Interval Code to a CSM Server 212 and receive ATSC metadata (e.g. channel, timecode, interactive services triggers, etc.) associated with the specified interval of broadcast content.

The systems of FIGS. 1 and 2 thus, through the use of watermarks, enable advanced presentation features when reliable metadata about the content, timing, and desired presentation features is not delivered to the client device with the content.

One use case for such watermarks is to provide interactive applications that enhance audio/video experience of viewers. In this scenario, the receiver uses information that it obtains from the extracted watermarks to access a web based server and to download secondary content, which can be used to enhance the primary content; such a secondary content is typically presented in synchronization with the primary content. The secondary content can be also created simultaneously with the first content, and linking them through watermarks may be done by the content producers. The secondary content can include T-commerce, director's commentary, character background, alternate language tracks, statistics of athletes in a sport event, etc.

Another use case for the disclosed technology can be the insertion or replacement of interstitial content such as advertisements and promotions which are not the same for all viewers. Such advertisement and promotions may be selected based on various factors such as known viewer preferences, viewer location (which may be determined based on the viewer's IP address), the time at which content is being viewed, or other factors. These are generally referred to as "targeted ads." Typically targeted ads are performed under the control of a content distributor that uses the embedded watermarks to carry information that is obtained by the client device to recover insertion instructions. Further use cases include audience measurement, rights administration, proof of performance, etc.

The detectors that are designed to detect such watermarks for ACR and other above noted applications, are often designed with a set of requirements that differ from requirements that are imposed to other watermark detectors, such as copy control watermark detectors. For example, time to the first watermark payload detection is more important for ACR watermarks compared to a copy control watermarks because of, for example, the importance of enabling synchronized presentation of a secondary content with a primary content. Also for ACR detectors it is desirable to report the timing of watermark boundaries as precise as possible. Finally, for ACR detectors it is desirable detect changes in the content rendering timeline. For example when a user decides to switch from one content to another, or choses to skip forward or backward within a content, the ACR detector should recognize such an action as fast as possible and to report it to the entities or applications at the higher levels of hierarchy. It should be noted that the term ACR detector is not used to limit the scope of the disclosure to automatic content recognition application. But rather ACR provides one example use of the disclosed technology and is used to illustrate the underlying concepts.

One of the basic assumption in describing some of the disclosed embodiments is that the watermark carries a string of digital symbols (which can be represented as a binary string). This string typically carries a synchronization portion (or a header portion), followed by a payload portion, and error correction and/or error detection strings. The watermark payload can also carry information about the primary content's timeline. Typically, this is achieved by including a field within the watermark payload (or a separate watermark) that constitutes a counter, which is incremented for each subsequent watermark. By detecting the watermark counter and knowing the watermark's extent (e.g., the duration or length of the primary content that each watermark occupies), the starting point within the primary content where watermark embedding started can be calculated. The watermark payload can further contain additional fields, such as an content ID, a channel ID, or a trigger flag. The trigger flag may signal to the device to perform predefined actions. For example, a trigger flag can signal to the receiver to halt any modification of audio and video in the primary content. Such a flag may be useful when the primary audiovisual content introduces an emergency alert that should not be disturbed.

Example Architecture for Watermark Detector:

In the sections an example architecture for implementation of a watermark detector and associated components within a receive device is described. In these sections, it is assumed that a primary content includes what is called a VP1 watermark, which has a structure and payload that is in compliance with the ATSC watermarks described in connection with FIGS. 1 and 2. It is, however, understood that the underlying concepts can be equally applicable to non-ATSC implementations.

Some of examples described below relate to receiver resolution of VP1 watermarks to recover ATSC service signaling from content received via redistribution. ATSC service signaling is the information included in the ATSC transmission stream which is not carried over redistribution networks, such as content and service identification signaling, ad insertion signaling, interactive service signaling, usage monitoring signaling, and hybrid service signaling.

Figure 3:
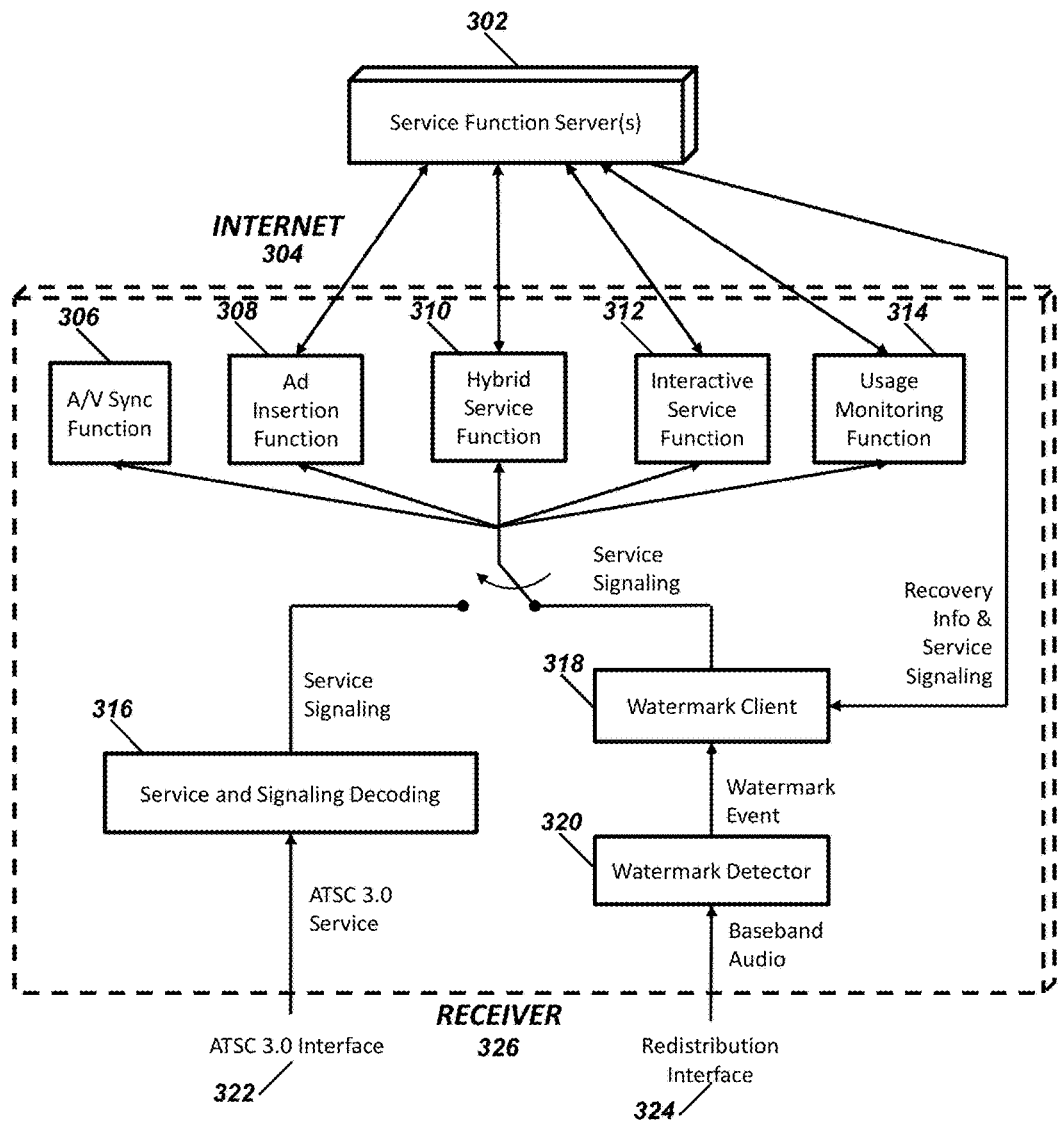
FIG. 3 illustrates a system diagram for a receiver device that includes a watermark detector and a watermark client in accordance with an exemplary embodiment.

FIG. 3 is a system diagram illustrating a watermark-enabled receiver 326 that is configured to include a watermark detector 320 and a watermark client 318, with a functional relationship to service functions in the receiver 326. An set of exemplary function are illustrated in FIG. 3 as: Audio/Visual Synchronization Function 306, Advertisement Insertion Function 308, Hybrid Service Function 310, Interactive Service Function 312 and Usage Monitoring Function 314. The above noted Functions are in communication (e.g., via the Internet 304) with Service Function Server(s) 302 to send and receive information, data and signals. In cases, where the content is received at the receiver device 326 through an ATSC 3.0 interface 322, the service signaling that is provided with the received content is expected to be readily obtained by standard service and signaling decoding 316. The purpose of the watermark detector 320 and watermark client 318 is to provide service signaling that is included in the over-the-air service to service functions of the receiver 326 in circumstances when the broadcast content is received over redistribution networks (redistribution interface 324 of the receiver 326) that do not deliver this information. Examples of service signaling which may be included in an over-the-air transmission but may not be delivered to receivers via redistribution channels include information for A/V synchronization (e.g. SMPTE 2064 A/V fingerprint data), dynamic ad insertion triggers and content, hybrid broadcast/broadband services (such as alternate audio and video overlay content), interactive services (e.g. HbbTV), and usage monitoring. Service signaling can be delivered from the service function server(s) 302 to service functions in the form of Service Messages (data elements which are passed directly to service function) or Service Files (data elements encapsulated in files which are delivered to a prescribed location in the file system for access by service functions).

In some exemplary embodiments, and as shown in FIG. 3, the watermark detector 320 accepts uncompressed audio as its input from the redistribution interface 324 and outputs watermark events which describe the watermark segments present in the input audio stream. The watermark client 318 receives information, including watermark events, from the watermark detector 320 and uses those information within a protocol (e.g., a standardized protocol) to retrieve service signaling associated with the detected watermark codes from signaling recovery servers, such as the service function server(s) 302 shown in FIG. 3. In some embodiments, a signaling recovery server is an HTTP file server which delivers service recovery information associated with a particular broadcast service to watermark-enabled ATSC receivers via broadband. The watermark events and service recovery information obtained from signaling recovery servers are used by the watermark client 318 to produce ATSC service signaling, which is provided to various modules or components in the receiver device 326. The watermark client 318 also reports information on the watermark state to service functions (e.g., when polled), including whether a watermarked segment is being presented and, if so, the service identifier and service time.

Figure 4:
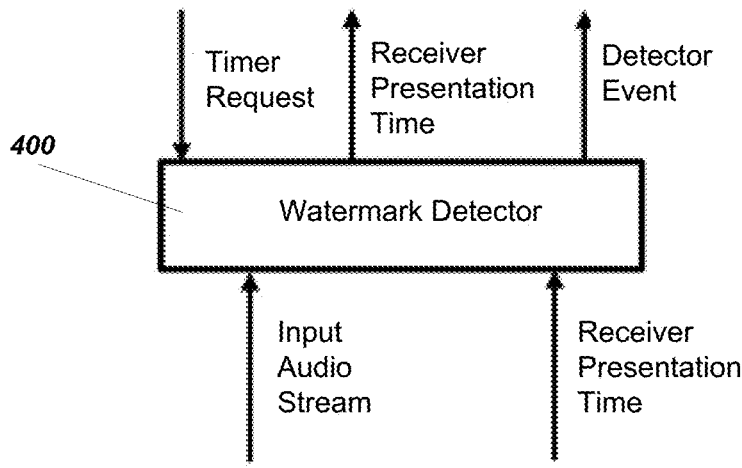
FIG. 4 illustrates the interfaces of a watermark detector in accordance with an exemplary embodiment.

A more detailed illustration of the watermark detector 400 component interfaces is provided in FIG. 4. One input to the detector is audio input stream. It is assumed that such audio is in uncompressed format. In FIG. 4, Receiver Presentation Time (sometimes referred to as "receiver time") is shown as an input to the watermark detector. It is assumed that watermark detector has a means to determine the receiver presentation time, which are values on the receiver presentation timeline (i.e., a timeline on which an input audio stream to the watermark detector is presented, synchronized to the video, sometimes also referred to as "receiver timeline"). The means with which the watermark detector receives this information can be implementation-dependent, and it may only require precision up to a video frame period. The watermark detector 400 may also output a receiver presentation time function which will output the receiver presentation time associated with the input audio most recently received by the watermark detector 400. The watermark detector 400 may provide a Timer event Request (TIR) function which schedules a Timer (TI) event for emission when a specified receiver presentation time is reached in the input audio. The watermark detector 400 is not required to support more than one simultaneous pending Timer event Request. In some embodiments, requests to schedule a Timer event when another Timer event request is pending causes the prior pending request to be replaced by the subsequent request.

Detector event is another output that is provided to the watermark client component. The indications and functionalities associated with the interfaces of watermark detector 400 of FIG. 4 are described in further detail in later sections of this document.

Figure 5:
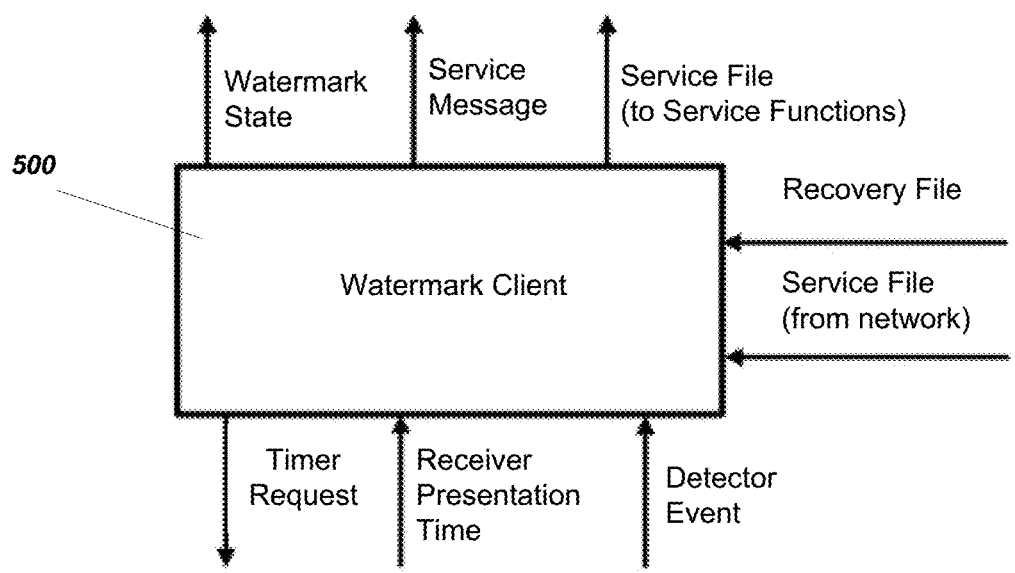
FIG. 5 illustrates the interfaces of a watermark client in accordance with an exemplary embodiment.

FIG. 5 is a simplified diagram that illustrates the interfaces associated with the Watermark Client 500 component in accordance with an exemplary embodiment. The watermark clients 500 provides watermark state and ATSC service signaling to service functions during the presentation of watermark segments of content received from redistribution networks. The Timer Request, Receiver Presentation Time, and Detector Event are interfaces to the watermark detector 500. The Recovery File and Service File interface from the network is an HTTP interface to a signaling recovery server, from which the described files are obtained. The recovery file is a file containing recovery information and service signaling in accordance with the disclosed embodiments. The service file is a file which conforms to a standardized service signaling specification (e.g. SMPTE TT, etc.). The Service Message interface to the service functions supports message delivery from the watermark client 500 to designated ATSC service functions. The Service File interface to the service functions supports delivery of files retrieved from the broadband network by the watermark client 500 in a receiver file-system location in a manner that is visible to and accessible by service functions. The indications and functionalities associated with the interfaces of watermark client 500 of FIG. 5 are described in further detail in later sections of this document.

Figure 6:
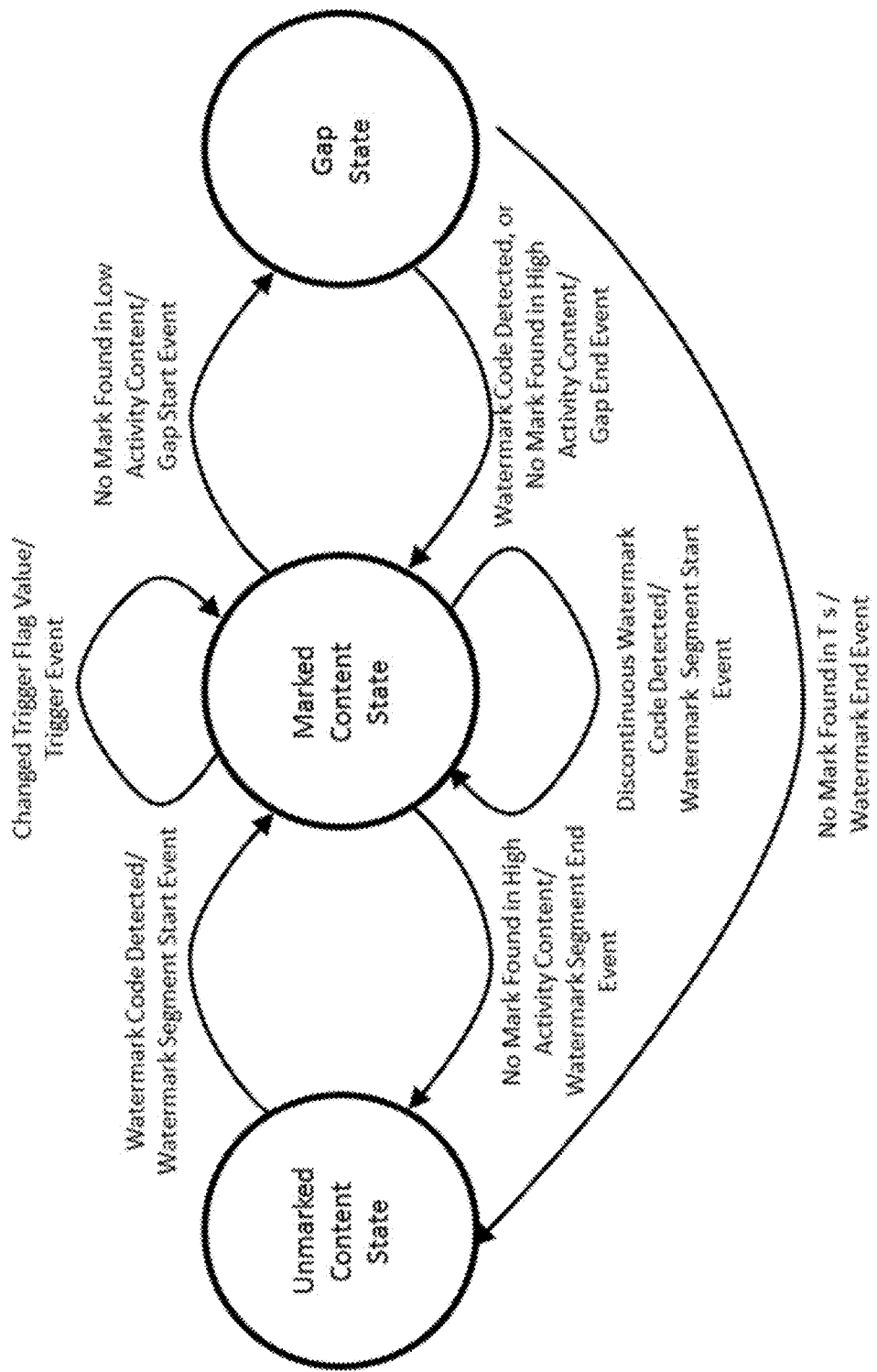
FIG. 6 illustrates a watermark detector state diagram with associated transition triggers in accordance with an exemplary embodiment.

A watermark detector of the disclosed embodiments can be described as moving between three different states: an unmarked content state, a marked content state and a gap state. An unmarked content does not include an embedded watermark; a marked content includes embedded watermarks; and a gap state is indicative of a content that is assumed to have embedded watermarks which can not be detected due to detection of a gap. FIG. 6 shows a detector state machine with possible transition triggers and associated actions based on the above described states. In some embodiments, when detector is initialized it is placed in the unmarked content state. FIG. 6 also shows "events" that describe the detection of a change of state of watermark segments, and include: Watermark Segment Start (WSS), Watermark Segment End (WSE), Gap Start (GS), Gap End (GE), and Trigger (TR) events.

Gap Start, Gap End and Trigger events occur only between Watermark Segment Start and Watermark Segment End events (i.e., during a watermarked segment).

A Watermark Segment Start event is output from the watermark detector when a watermark code is detected in the input primary content which does not have continuity with a previously detected watermark code. Continuity exists when successive watermark codes conform to the watermark segment embedding specification. For example, those watermarks can have the same Server Code, successive Interval Codes, the same trigger bit status, and a watermark code spacing of 1.5 seconds. A Watermark Segment Start event can cause a transition from the Unmarked Content State to the Marked Content State, or a transition from the Marked Content State to the same state when caused by detection of a discontinuous watermark code.

A Gap Start event is output from the watermark detector when a watermark code is not detected with continuity from the primary content following a previous watermark code. In some embodiments, the Gap Start event is accompanied by a low audio condition that indicates that, for example, the audio sample or energy values are zero or are below a predetermined threshold. A Gap Start event causes a transition from the Marked Content State to the Gap State.

A Gap End event is output from the watermark detector when, following a Gap Start event, a low audio condition is no longer present or when a watermark code is detected. A Gap End event causes a transition from the Gap State to the Marked Content State. Based on experiments conducted by the inventors, disturbances, such as channel change, skip forward or skip back, in the playback of a digital television broadcast produces brief intervals of low or zero content activity, such as silence intervals. In scenarios dither embedding is used during, or prior to, content distribution to embed watermark messages even in low activity content sections, a failure to detect watermarks from low audio sections of a received content is a strong indication that a content interruption due to a user action (e.g., channel change, skip ahead, etc.) has taken place. In some scenarios, detection of such content interruptions causes the associated interactive secondary content to be suspended.

A Watermark Segment End event is output when the watermark detector determines that a watermark code cannot be detected with continuity in the primary content following a previous Watermark Segment Start event and a low audio is not present. A Watermark Segment End event is only output based on a failure to detect a continuous watermark code; it is not output when a discontinuous watermark code is detected (in this case, a Watermark Segment Start event is output). A Watermark Segment End event causes a transition from the Marked Content State to an Unmarked Content State.

A Trigger event is output from the watermark detector when the value of the Trigger field of a watermark code is determined to have changed between consecutive watermark codes in a watermark segment. When a Trigger event occurs, the watermark detector outputs the watermark code, and the timing information associated with the detected watermark (e.g., content timeline at which the trigger event occurred, starting boundary of the watermark payload carrying an instance of a watermark code, etc.

Referring again to FIG. 6, the only event that can cause the detector to exit the unmarked content state is detection of a watermark, which triggers a Watermark Start Segment event in conjunction with a query to the web server to access metadata and transition to Marked Content State. In Marked Content State, there are four possible events. First, it is possible to detect the trigger flag, which again causes a Trigger event in conjunction with a query to the web server to access metadata, but the detector remains in the Marked Content State. When a discontinuous watermark code is detected, it causes a Watermark Segment Start event in conjunction with a query to the web server to access metadata, while the detector remaining in the Marked Content State. This scenario corresponds to content transition without a gap detection.

In some scenarios, when no watermarks are found over a predefined time interval of T seconds (including continuously failing prediction attempts) the Watermark End Event is signaled, signifying that content has been switched and all interactivity should be canceled.

From the Gap State, a transition to the Marked Content State is possible when a watermark is detected or watermark prediction succeeds (e.g., mismatch between predicted and extracted bit patterns is below a threshold). Also when watermark detection fails, but high activity content (e.g., an increased audio energy) is found before a predefined time interval of T seconds expires, the detector exits the Gap State and transition to the Marked Content State, as part of a Gap End event. When watermark detection fails over the predefined time interval, detector signals Watermark Segment End event, signifying that all interactivity should be canceled upon transitioning from the Gap State to the Unmarked Content State.

The above-described state machine architecture enables systematic access to metadata at a remote server based on a state of the watermark detector and particular events that cause transitions to different states.

Another event associated with the disclosed watermark detectors is a Timer (TI) event that is output from the watermark detector when the receiver presentation time reaches the time specified in a Timer Request (TIR) function during a watermark segment. This value is reported with the event. The Table below shows an exemplary set of information that are reported along with each watermark-related event. It should be noted that the reported information in this Table is provided to serve an example of possible reported information, and fewer or additional information may be reported in certain applications.

| Watermark-Related Event Type | Reported Information |
| --- | --- |
| Watermark Segment Start (WSS) | Receiver Codestamp |
| Watermark Segment End (WSE) | [None] |
| Gap Start (GS) | Receiver Presentation Time |
| Gap End (GE) | [None] |
| Trigger (TR) | Watermark Code |
| Timer (TI) | Receiver Presentation Time |

In above Table, receiver codestamp is a codestamp produced by a detector associating a detected watermark code with a time on the receiver presentation timeline. Watermark code is the information carried in an instance of the watermark payload, such as a Server Code value, Interval Code value, and a Trigger Bit value. When a receiver codestamp is reported, it includes the detected watermark code and the receiver presentation time associated with the starting boundary of the watermark code in the input audio. When a receiver presentation time is reported, it is the time in receiver timeline where the reported event was determined to have occurred in the input audio.

The watermark state interface to the watermark client provides real-time information about the state of the service as determined by the watermark client and watermark detector. This includes a state indicator (Inactive, Active, Gap), a Service Identifier, and a Service Time. In the Inactive state, the Service Identifier and Service Time correspond to the most recent active content segment presented by the receiver. Service time is a time on a service timeline designated as a primary reference for synchronization of events to the watermark. Service Identifier is an for broadcast service associated with the watermarked content.

In the Active state, the Service Identifier and Service Time correspond to the content currently being presented by the receiver. Inactive state indicates that the content being presented by the receiver does not carry the service recovery watermark. Active state indicates that the content being presented by the receiver carries the service recovery watermark, service recovery information is available, and the watermark detector has timecode synchronization to the content. Gap state indicates that the content being presented by the receiver carries the service recovery watermark, service recovery information is available, but the watermark detector does not have timecode synchronization to the content (e.g. the content may be paused, in trick-play mode, or there may be content processing which is disrupting watermark detection). Changes to the watermark state are announced to service functions by the watermark client when they occur.

In some embodiments, the service time is polled from the watermark client by service functions. In Active state, the service time is equal to the receiver presentation time translated to the service timeline per the timestamp calculations that are described later in this document. In Gap state, the service time is equal to the receiver presentation time reported by the watermark detector in the Gap Start event translated to the service timeline. In Inactive state, the Service Time is undefined. In some embodiments, the initial state of the watermark client is Inactive.

Watermark Client Internal State:

The watermark client can maintain a Timed Event Queue (TEQ) which is a queue of timed events ordered by time on the receiver presentation timeline. It should be noted that the timed events that are referenced in this section and sections that follow refer to events related to the Recovery File that is arranged to occur at particular instances of time. These timed events, which are further described in this patent document, should not be confused with watermark events produced by the watermark detector, namely watermark segment start event, watermark segment end event, gap start event, gap end event, trigger event and timer event. In particular, timed events that are conveyed through the recovery file(s) indicate that the receiver should perform an action at the time specified by the timed event. The action can be specified by the Event Type field of a timed event (e.g., can be one of File Delivery, Message Delivery, Query Event, or Null, as described in the sections that follow). A timer event, on the other hand, is an output of the watermark detector. For example, the value of the timer event is set by the watermark client via a timer event request (TIR); when the media time tracked by the watermark detector reaches the timer value, the detector fires the timer event to inform the watermark client.

The TEQ enforces uniqueness of Event Identifiers such that when a timed event is added to the TEQ, any other event on the TEQ with the same Event Identifier is deleted from the TEQ regardless of the value of other data elements in the timed events. The watermark client also maintains current Service Identifier and Service Timestamp values based on information received in a Recovery File. In some embodiments, these have initial value NULL. The watermark client tracks the watermark detector state (Inactive, Active, Gap) based on the receipt of watermark events from the watermark detector. Internal state data persists across changes to the watermark state. In some embodiments, the watermark client also maintains an internal value for Trigger Slack. Trigger slack is an amount of service time (e.g., in seconds) beyond trigger detection which is suggested for trigger query.

Watermark Detector Event Processing:

The following sections describes exemplary operations that are carried out as part of the processing the various events that were described earlier.

Watermark Segment Start Event:

Upon receipt of a watermark segment start (WSS) event from the watermark detector, the watermark client's may perform the following actions:

1) Clear the TEQ.
2) Issue a query as defined in the Query Protocol (described below) to obtain a Recovery File.
3) Process the Recovery File (described below).
4) Set the Watermark State to Active.

Watermark Segment End Event:

Upon receipt of a watermark segment end (WSE) event from the watermark detector, the watermark client transitions to Inactive state and the Timer event Request (TIR) is cleared.

Gap Start Event:

Upon receipt of a gap start (GS) event from the watermark detector, the watermark client may perform the following:

1) Set the Watermark State to Gap.
2) Clear the TIR.

Gap End Event:

Upon receipt of a gap end (GE) event from the watermark detector, the watermark client may perform the following:

1) Set the Watermark State to Active.
2) Update the Service Time to receiver presentation time translated to the Service Timeline per the timestamp computation operations (described below).
3) Remove all timed events from the TEQ whose Delivery Time is earlier than the Service Time. Delivery Time is the time on the segment timeline when the corresponding event is scheduled to occur.
4) Schedule a Timer event Request (TIR) for the Delivery Time of the first timed event on the TEQ.

Trigger Event:

Upon receipt of a Timer (TR) event from the watermark detector, the watermark client may add a Query event to the TEQ with Event Time equal to receiver presentation time plus a randomly selected value between 0 and Trigger Slack. Setting of the Event Time in this manner is a practical measure that spreads, in time, the potentially large number of queries that could be simultaneously triggered from a multitude of client devices in response to the detection of a trigger bit.

Timer Event:

As a preliminary note, the "Event Type" that is used in the following description of timer event corresponds to the Event Type that is received as part of the recovery file. As noted earlier, the timed events of the recovery file should not be confused with watermark events (e.g., watermark start segment, gap start, etc.) that are output from the watermark detector.

Upon receipt of a Timer (TI) event from the watermark detector, the watermark client may perform the following:

1) Remove the first event from the TEQ.
2) Process the removed event as follows:
   A) If the Event Type is File Delivery and the Service Function is present and active (e.g., supported by the receiver device and currently in operation), request the identified file from the identified URL and for delivery to the specified Service Function.
   B) If the Event Type is Message Delivery and the Service Function specified in the event is present and active, pass the message to the identified Service Function.
   C) If the Event Type is Query event, issue a Query followed by Recovery File Processing.
   D) If the Event Type is Null, no action is taken.
3) Set a Timer event Request (TIR) in the watermark detector for the Event Time of the first event on the TEQ, translated to the receiver presentation timeline per the timestamp calculation protocol (described below).
4) If another Timer (TI) event is signaled while a TI event is being processed, complete processing of the current TI event and then process the subsequent TI event.

Internal Watermark Client Functions

Recovery File Processing:

The following steps can be performed as part of recovery file processing:

1) Compute a Service Timestamp using the receiver Codestamp from the watermark detector and the Service Codestamp from the Recovery File (RF) and store in the watermark client internal state.
2) Store the Service Identifier from the RF in the watermark client internal state.
3) Store the Trigger Slack from the RF in the watermark client internal state (or 0, if Trigger Slack is not specified).
4) For each timed event in the RF:
   A) If the Delivery Time for the timed event is earlier than the Service Time, discard the timed event without adding it to the TEQ.
   B) If Event Type is File Delivery Event and the Service Function is present and active, add the timed event to the TEQ with Event Time sufficiently in advance of the Delivery Time to enable timely delivery (based on Size).
   C) If Event Type is Message Delivery event and the Service Function is present and active, add the timed event to the TEQ with Event Time equal to Delivery Time.
   D) If Event Type is Query, add the Query event to the TEQ with Event Time equal to Delivery Time plus a randomly selected value between 0 and the designated Slack (or 0, if Slack is not specified).
5) Set a Timer event Request (TIR) with the watermark detector for the Event Time of the first event on the TEQ, translated to the receiver presentation timeline using the Service Timestamp.

Timestamp Calculations:

In order to effectively provide the intended service that is associated with a primary content at the intended instant in time, it is important to harmonize different timing information that may be provided based in differing timelines. In particular, conversions among time values on the service timeline, the receiver presentation timeline, and the current time of day (e.g., UTC-based) timeline may be needed to allow delivery of a particular service at the correct time instance with respect to the primary content in conformance with the service provider's instructions. Such a harmonization and conversion of timing values are particularly important when content playback occurs on a time-delayed basis (e.g., in pre-recorded format, tape-delayed, etc.). The timing calculations that are described below facilitate conversions between various timing information that may be obtained from the service provider, the watermarks that are embedded in the content, the watermark detector that extracts the embedded watermarks or other sources of timing information.

Before describing the timing conversion equations, it is helpful to clarify the disclosed nomenclature as follows. Time is a time value on a timeline, such as a UTC format time or sampling interval (frame) count. Timeline is a reference frame for describing time, represented as a linear scale against which time can be measured.

A timestamp is a data element which associates two times on two different timelines that correspond to the same moment in time. A codestamp is a data element which associates a watermark code with a time on a timeline.

Service Time is a time on the service timeline. Service timeline is a timeline designated as a primary reference for synchronization of events to the watermark. Service codestamp is a codestamp associating a watermark code in a watermark segment with a service time. Service timestamp is a timestamp representing a correspondence between a receiver presentation time and a service time. As noted earlier, receiver presentation time is a value on the receiver presentation timeline (i.e., a timeline on which an input audio stream to the watermark detector is presented, synchronized to the video).

The following example of a service codestamp is provided for clarification purposes. A codestamp consists of a watermark code and a service time. The service time identifies the starting boundary of a content interval in which the watermark is embedded. For example, [(100, 3600, 0), Dec. 17, 2014 @ 12:00 am] is a codestamp where (100, 3600, 0) is a watermark code consisting of a server code 100, an interval code 3600, and a trigger value 0; the Dec. 17, 2014 @ 12:00 am is a UTC time value. This UTC time value can alternatively be represented using a value 1418774400 that is the number of seconds since Jan. 1, 1970 00:00:00, International Atomic Time (TAI).

A service timestamp (denoted by $[t_{st}, t_{rt}]$) is calculated from a service codestamp (denoted by $[(s_{sc}, i_{sc}, T_{sc}), t_{sc}]$, where $(s_{sc}, i_{sc}, T_{sc})$ is a watermark payload containing server code $s_{sc}$, interval code $i_{sc}$, and trigger value $T_{sc}$, and $t_{sc}$ indicates the time on the service timeline associated with the starting boundary of the watermark payload embedded in content carried in a service) and a receiver codestamp (denoted by $[(s_{rc}, i_{rc}, T_{rc}), t_{rc}]$, where $(s_{rc}, i_{rc}, T_{rc})$ is a watermark payload containing server code $s_{rc}$, interval code $i_{rc}$, and trigger value $T_{rc}$, and $t_{rc}$ indicates the time on the receiver timeline associated with the starting boundary of the watermark payload detected in content presented at a receiver) as:

$$[t_{st}, t_{rt}] = [1.5(i_{sc} - i_{rc}) + t_{sc}, t_{rc}] \qquad (1).$$

In Equation (1) above, $[t_{st}, t_{rt}]$ indicates that a service time (denoted by $t_{st}$) is associated with a time on the receiver timeline (denoted by $t_{rt}$) and the codestamp $[(s,i,T),t]$ denotes that a watermark code with server code s, interval code i, and trigger value T was detected with its starting boundary at time t. Further, in Equation (1) above, the constant value 1.5 represents the duration of the watermark message in seconds.

The service timestamp $[t_{st}, t_{rt}]$ is used to translate a service time $t_s$ to a time $t_r$ on the receiver timeline as using the following relationship:

$$t_r = t_s + (t_{rt} - t_{st}) \qquad (2).$$

The inverse of this relationship can likewise be used to translate from a receiver time to a service time, as follows:

$$t_s = t_r - (t_{rt} - t_{st}) \qquad (3).$$

Alternate Watermark Client Approaches:

Alternate approaches to implementation of the Watermark Client are possible to achieve similar desirable functionality. An alternative implementation achieves reduced complexity and processing requirements by eliminating the timed event Queue and the Timer Event of the Watermark Detector. In this case, all events included in a Recovery File at the time the recovery file is processed. In this approach, the Service Messages are immediately delivered to the designated Service Function along with the Delivery Time and the Service Function can decide when to process the Service Message. Service Files may be retrieved at the time of Recovery File processing and designated recipient System Functions can be notified of the availability and intended Delivery Time of those Service Files as they arrive. Such an implementation may require additional logic in the Service Functions to manage the timing with which Service Messages and Service Files are processed and may also require additional memory to store Service Messages and Service Files containing data that is not yet needed by the Service Functions.

Another alternative implementation approach includes the delivery of the Service Time along with delivery of Service Messages and Service Files to Service Functions.

Another alternative implementation includes a global or external timing source in the receiver which is accessible by the watermark detector, the watermark client, and the Service Functions. In this embodiment, the need for reliance on passing timing information between these functions is reduced or eliminated.

In another alternative implementation, the watermark detector does not report timer events, but instead reports a watermark segment start (WSS) event in its place.

Query Protocol

A query is an HTTP GET using the exemplary URL template: http://{ServerCode}.vp1.org/atsc30/{IntervalCode}.a3r. The fields {ServerCode} and {IntervalCode} are replaced with the 8-character ASCII representation of the associated fields from the most recently detected watermark code. The vp1.org root domain DNS ensures that the query is directed to the service function server associated with the server code. The server response is a Recovery File in the format described below.

Recovery File Format:

Recovery Files contain structure data fields (e.g. XML) as described in Table 1 below.

TABLE 1

Exemplary Structure and Contents of A Recovery File

| Element | Count | Format | Description |
| --- | --- | --- | --- |
| Version | 1 | [ATSC 3.0 Version format] | Version number of the Recovery Information file spec with which this file complies |
| Service Codestamp | 1 | Codestamp | Codestamp mapping an Interval Code in this Watermark |

TABLE 1-continued

Exemplary Structure and Contents of A Recovery File

| Element | Count | Format | Description |
|---|---|---|---|
| Service Identifier | 1 | [ATSC 3.0 Service Identifier format] | Segment to a time on the Service Timeline Identifier for broadcast service associated with the watermarked content (which may also indicate a non-service-bound capability) |
| Trigger Slack | 0 ... 1 | Float | Amount of service time (in seconds) beyond trigger detection which is suggested for trigger query |
| Event | 0 ... N | Timed Event | An event to be performed by the Watermark Client |

In Table 1 above, [ATSC 3.0 Version Format] is a version identifier for the Recovery File in an encoding format designated by ATSC. Codestamp is a data element containing an interval Code and a time in the ATSC Service Time format. [ATSC 3.0 Service Identifier Format] is a service identifier in an encoding format designated by ATSC. The format must designate an identifier to indicate that the content is not bound to a service (e.g. content watermarked upstream from the broadcast service). [ATSC 3.0 Service Time format] is a format designated by ATSC for identifying service time values. Trigger slack identifies a maximum interval of time within which a query may be initiated subsequent to detection of a trigger indication from the embedded watermarks.

The recovery file can include a plurality of timed events (shown as 0 through N) that are received by the receiver device. Such events are executed or triggered at associated times. This way, the receiver has the necessary knowledge of the type and number of events that need to be processed ahead of time, and multiple queries to the service provided can be avoided. Timed event has the structure described in Table 2 below.

TABLE 2

Exemplary Structure and Contents of A Timed Event

| Element | Count | Format | Description |
|---|---|---|---|
| Event Identifier | 1 | [LargeID] | [Unique identifier for this event to de-duplicate events which appear in multiple recovery information files] |
| Delivery Time | 1 | [ATSC 3.0 Service Time format] | Time on the Segment timeline when this event is scheduled to occur |
| Event Type | 1 | Event Type (File Delivery, Message Delivery, Query or Null) File Delivery | Descriptor of the type of Event |
| Service Function | 1 | [ATSC 3.0 Service Function Identifier] | [One of: Usage Monitoring, Dynamic Ad, Interactivity, A/V Sync, Hybrid, etc.] |

TABLE 2-continued

Exemplary Structure and Contents of A Timed Event

| Element | Count | Format | Description |
|---|---|---|---|
| URL | 1 | URL | URL of the resource to request |
| Size | 1 | Integer64 | Size of the file (may be approximate, but should be an upper bound) |
| Message Delivery | | | |
| Service Function | 1 | [ATSC 3.0 Service Function Identifier] | [One of: Usage Monitoring, Dynamic Ad, Interactivity, A/V Sync, Hybrid, etc.] |
| Message Data | 1 | [Binary or ASCII] | Information to be delivered |
| Query | | | |
| Slack | 0 ... 1 | Float | Amount of service time (in seconds) beyond Delivery Time for which recovery information is provided in this Recovery File |
| Null | | | |
| | 0 | — | — |

In Table 2 above, [LargeID] is a value in a sufficiently large space that values can be assigned in a manner that can be reasonably assumed unique within a Watermark Segment. In one example, the is a 64-bit unsigned integer. [ATSC 3.0 Service Function Identifier] is an identifier of an ATSC 3.0 service function such as Usage Monitoring, Hybrid Service, Interactive Service, A/V Sync, Dynamic Ad Insertion to which this event is targeted. A/V Sync event is a timed event for enabling synchronization between audio and video components. For example, a time point of the video in a timed event for video is synchronized with a time point in another timed event for audio Event Type is an identified of either a File Delivery Event or a Message Delivery Event. [ATSC 3.0 Service Information Destination] is a folder or other location designation defined by ATSC 3.0. URL is a W3C-compliant Uniform Resource Locator. [Binary or ASCII] is a format for encoding of message data to Service Functions defined by ATSC 3.0. Slack is maximum interval value within which a query to the server can be delayed. Similar to the above discussions regarding Trigger Slack, slack provides a practical measure that enables the associated queries initiated by multiple receivers to be spread over the slack time interval.

Figure 7:
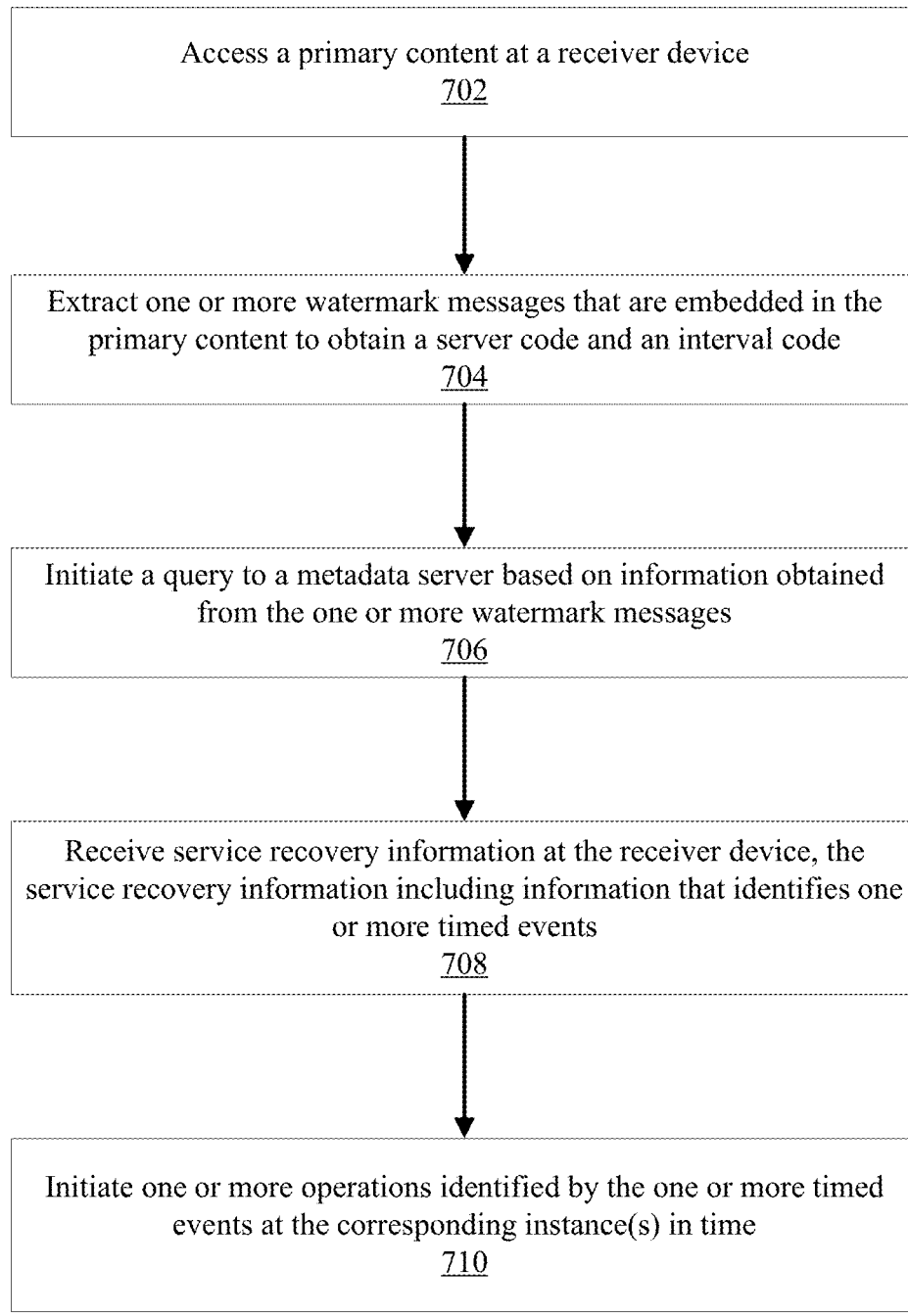
FIG. 7 illustrates a set of exemplary operations that can be carried out to acquire information related to a primary content in accordance with an exemplary embodiment.

FIG. 7 illustrates a set of exemplary operations that can be carried out to acquire information related to a primary content in accordance with an exemplary embodiment. At 702, a primary content at a receiver device. At 704, one or more watermark messages that are embedded in the primary content are extracted to obtain a server code and an interval code. The one or more watermark messages can be extracted using a watermark detector that it implemented at least partially in electronic circuits. At 706, a query is initiates to a metadata server based on the information obtained from the one or more watermark messages. At 708, service recovery information is received at the receiver device. The service recovery information includes information that identifies one or more timed events, and each timed event identifies an operation to be performed by the receiver device at a corresponding instance in time as the primary content is being presented by the receiver device. At 710, one or more operations identified by the one or more timed events are initiated at the corresponding instance(s) in time.

In one exemplary embodiment, the service recovery information includes the following information corresponding to the one or more timed events: a delivery time representing a time at which the associated timed event is scheduled to occur, and one or more of the following: a uniform resource locator (URL) associated with a file containing event information, or message data containing event information. In another exemplary embodiment, the service recovery information is received as one or more service recovery files, and the service recovery information includes a service codestamp and a service identifier. The service codestamp maps an associated interval code to a service time which is a time value on a service timeline associated with a service, and the service identifier is an identifier for a service associated with the primary content.

According to another exemplary embodiment, the above note method further includes computing a service timestamp using the service codestamp and a receiver codestamp, and storing the service timestamp and the service identifier in a storage device of the receiver device. In yet another exemplary embodiment, the service recovery information includes a trigger slack value that identifies a maximum interval of time within which a query can be initiated subsequent to detection of a trigger indication. For example, the trigger indication can be produced upon detection of a change in value of a trigger field of the one or more watermark messages that are extracted from the primary content.

In another exemplary embodiment, the service recovery information includes a delivery time associated with each timed event representing a time at which the associated timed event is scheduled to occur, and an event type that specifies one of a file delivery, message delivery, query or null events. In this embodiment, the above noted method further includes (for each timed event): upon a determination that the delivery time is earlier than a service time, discarding the timed event; upon a determination that the event type is a file delivery event, adding the timed event to a timed event queue; upon a determination that the event type is a message delivery event, adding the timed event to a timed event queue with event time equal to the delivery time; upon a determination that the event type is a query, adding the timed event to the timed event queue with event time equal to the delivery time plus (a) a randomly selected value between zero and a predetermined slack value, or (b) zero, if the slack value is not specified. In yet another embodiment, the above noted method additionally includes providing, to the watermark detector, a timer event request (TIR) associated with earliest event in the timed queue event and having a time value that is translated to a receiver presentation timeline. The receiver presentation timeline represents a timeline that is controlled by the receiver device on which audio components of the primary content input to the watermark detector are presented in synchronization with video components of the primary content.

Another aspect of the disclosed embodiments relates to a device that includes a processor and a memory including processor-executable code. The processor executable code, when executed by the processor, causes the device to access a primary content and extract, by a watermark detector, one or more watermark messages that are embedded in the primary content to obtain a server code and an interval code. The processor executable code, when executed by the processor, further causes the device to initiate a query to a metadata server based on the information obtained from the one or more watermark messages, and receive service recovery information at the device. The service recovery information includes information that identifies one or more timed events, where each of the plurality of timed events identifies an operation to be performed at a corresponding instance in time as the primary content is being presented or accessed by the device. The processor executable code, when executed by the processor, further causes the device to initiate one or more operations identified by the timed events at the corresponding instance(s) in time.

Another aspect of the disclosed embodiments relates to a method for recovering lost metadata of a primary broadcast content that includes extracting a watermark message from a primary broadcast content that is received at a receiver device to obtain a server code and an interval code, and initiating a query to a metadata server that is identified using the server code, the query further including the interval code. This method further includes receiving information at the receiver device from the metadata sever that enables retrieval of lost metadata as service recovery information. The service recovery information includes a plurality of timed events, where each timed event includes a service identifier and a service timing information. The service identifier identifies a service associated with the primary broadcast content and the service timing information identifies an execution time of an operation to be performed as the primary content is being presented by the receiver device.

Figure 8:
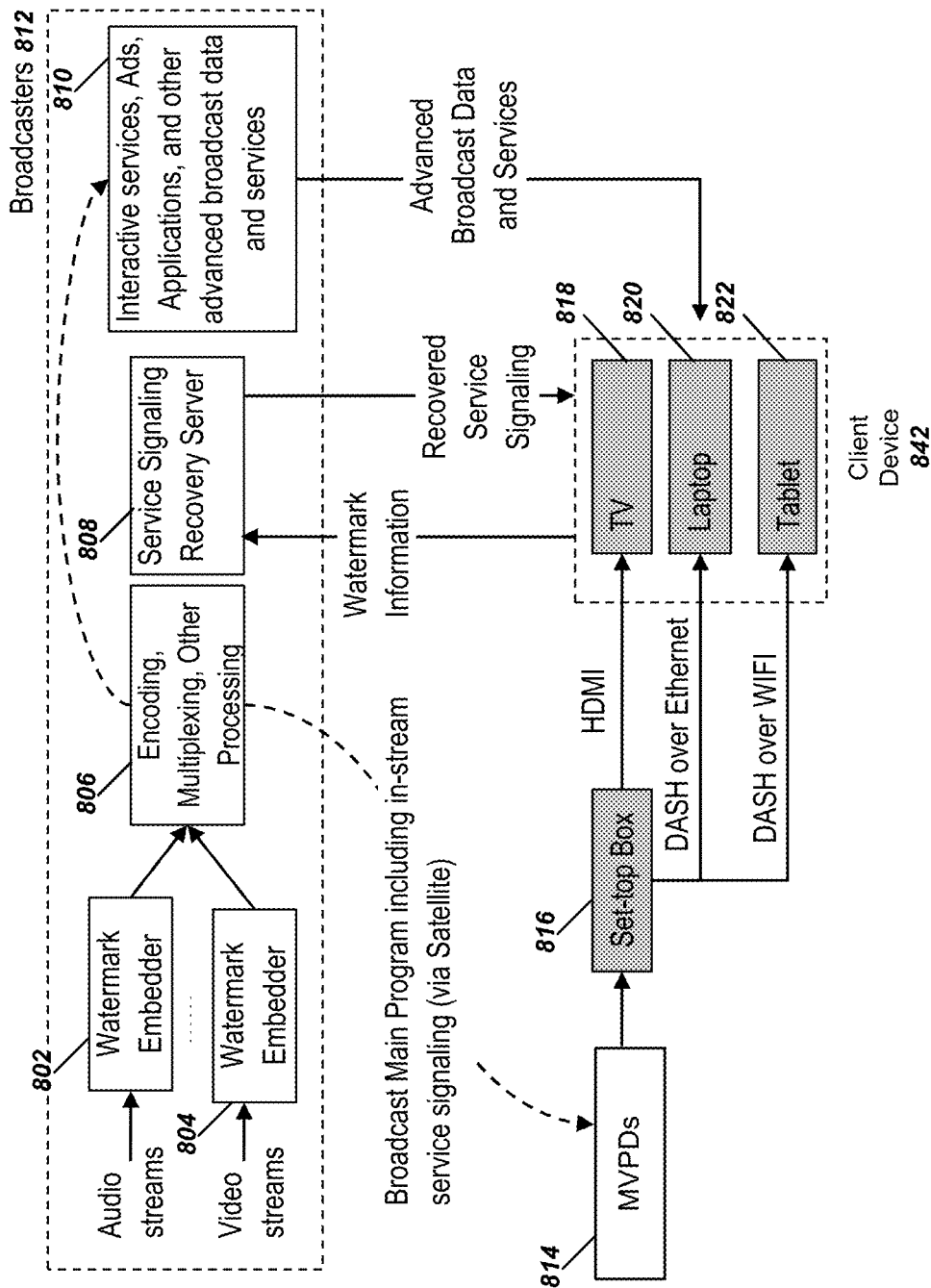
FIG. 8 is a exemplary system architecture that illustrates content redistribution and service signal recovery in accordance with an exemplary embodiment.

FIG. 8 is a exemplary system architecture that illustrates content redistribution and service signal recovery in accordance with an exemplary embodiment. One or both of the audio and video streams are embedded with watermarks using watermark embedders 802, 804. The encoding, multiplexing and other processing 806 includes components that enable content encoding, multiplexing and other content processing (if needed). Service signaling recovery server(s) 808 enable delivery of service signaling to the client device (s) 824. Interactive services, advertisements, and other advanced broadcast data and services 810 may also be stored, and subsequently retrieved and provided to the client device(s) 824. The encoded content (e.g., main program including in-stream service signaling) can be provided to MVPS 814, and delivered to a set top box 816. The set top box 816 provides the main program to the client device(s) 814, which may be a TV 818, a Laptop 820, a Tablet 822 or another device that is capable of receiving the media content. Content delivery from the set top box 816 to the client device(s) 824 can take place via HDMI, Dash over Ethernet, DASH over WiFi, or other wired or wireless communication protocols and channels. The disclosed embodiments use service signaling recovered through digital watermarks to enable broadcast services for both non-real-time and live broadcasting of a primary content.

In the sections that follow example implementations are described that primarily focus on providing targeted advertisements ("targeted ads" or "ads") as a broadcast service. It is, however, understood, that the disclosed embodiments can also be applied to other broadcast services such as secondary audio, catch-up TV services, video on demand (VOD), interactive features, multi-view video and Internet applications. The service signaling that is used to enable targeted advertisements is also sometimes referred to as targeted advertisement insertion signaling or simply ads signaling.

As discussed earlier, targeted advertising is a type of advertising whereby advertisements are placed so as to reach consumers based on various traits such as demographics, psychographics, behavioral variables (such as product purchase history), firmographics or other second-order activities which serve as a proxy for these traits. In some embodiments ads signaling includes (1) the timing information that specifies when one or more ads are inserted, (2) identification information about the ads (e.g., which targeted ad is inserted for a specific geographic region), and (3) location information where the ads can be accessed (e.g., the URLs of the ads, or the file names in a local cache). Society of Cable and Television Engineers (SCTE) 35, Digital Program Insertion Cueing Message for Cable, is an example of ads signaling standardized by the MVPD industry. For Over-the-air broadcasting (from TV stations to TVs) or MVPD distribution (from cable headends to set-tip-box) such ads signaling is often carried as in-stream metadata in media streams such as ISO Base Media File Format (ISOBMFF) or MPEG-2 Transport Stream (MPEG-2 TS).

In redistribution scenarios where service signaling associated with the primary program is lost, such signaling must be recovered from external sources in order to enable the associated services. The following examples, describe recovery of such lost service signaling based on watermarks that are embedded in the primary program. In some embodiments, ads signaling includes at least the following fields: (a) timing information that specifies when the ads are inserted; (b) duration of ads or the timing information when ads insertion ends; and (c) information about the ads including ads identifiers, URLs or local file names to obtain the ads.

Exemplary Query Events to Obtain Ads Signaling:

The process of service signaling recovery is typically triggered by query events. For example, a query event may be initiated upon occurrence of one or more of the following: (1) the client device detects an event flag embedded as in one or more watermark in the primary program, which may also contain additional information that allows the client to resolve a URL of an ads signaling recovery server; (2) the client device detects a discontinuity in the main program caused by, for example, a channel switch, a pause or a trick play initiated by the consumer on the client device (e.g., a personal video recorder (PVR)); (3) the client device detects in-stream events such as an "emsg" box in ISOBMFF; (4) occurrence of application-level descriptive events such as DASH events specified as period-level event streams in a Media Presentation Description (MPD). Two types of events are defined in DASH: MPD validity and period-level event stream.

In an exemplary embodiment, once one of the above query events occurs, the client device sends a request to a service signaling recovery server to access service signaling. The URL of the service signaling recovery server can be obtained from the watermark information as described earlier. One exemplary query event includes at least the following fields: (a) a location such as URL where the ads signaling can be obtained; (b) timing information which specifies a location (e.g., a video frame) on the presentation timeline of the primary content (examples of such timing information can be a Universal Time Clock (UTC) value of broadcast service time for linear TV, or a watermark time-code that can be mapped to a service time); and (c) a duration between the current media time and a future media time, within which the service signaling of all ads associated with the duration can be accessed.

Exemplary Delivery of Ads Signaling:

The ads signaling can be delivered using various methods, such as: (a) delivery as in-stream metadata of a media format such as MPEG-2 TS and ISOBMFF; (b) delivery as part of application-level manifest such as DASH MPD proposed by DASH Industry Forum ("Ad Insertion in DASH"); (c) delivery by HTTP servers as a file. The service signaling for one or more broadcast services associated with a period of content (e.g., a content segment, or fixed duration such as a watermark interval at 1.5 s) can be stored as a service signaling file at a service signaling recovery server.

When service signaling is delivered as a file via HTTP, the file may contain remote elements for later resolution. Resolution or dereferencing of a remote element is a process that obtains the content referred by the remote element and replaces the remote element and any other part of the file with the obtained content of the remote element in the signaling file. A remote element includes two attributes: 1) a URL pointing to a web location from where the complete content of the remote element can be obtained, and 2) the method specifying when the remote element will be resolved. One method is to resolve the remote element once a client device receives the service signaling file in which the remote elements are contained in the beginning of the file. Another method is to resolve the remote element once the client's parser of the signaling file reaches and accesses the remote elements. With the second method, the remote elements may be specified in any place of a service signaling file.

The remote elements in service signaling file allows for later binding of broadcast services such as dynamic and targeted ads insertion, or updates and control of broadcast services. Such later binding allows the broadcaster to enable real-time sales and delivery of ads breaks. For example, a broadcaster can populate a service signaling file for a live content that contains a remote element and specifies ads insertion. Initially, the remote element cannot be resolved or can be resolved to empty content. Later, the broadcaster populates more targeted ads signaling as resolved content of the remote element as advertisers bought more ads breaks.

The remote element also enables delivery of the broadcast services provided by program producers, networks, and local stations using a single service signaling file. For example, a service signaling file produced by a local station may include a remote element that can be resolved to the service signaling produced by the broadcast networks. Moreover, the network's service signaling resolved from local station's service signaling file may also contain a remote element that can be resolved to the service signaling of a program producer.

Exemplary Ads Insertion and Interactive Services:

In some embodiments, targeted ads insertion and an interactive service, such as a live poll of a TV program being watched by a viewer, may take place in parallel. While the interactive service is active, a targeted ad is inserted to replace the TV program but keep the interactive service alive. In another scenario, during a targeted ad, an interactive service is activated. In this case, service signaling for both ads insertion and interactive service may be delivered to the client device as a single service file.

Figure 9A:
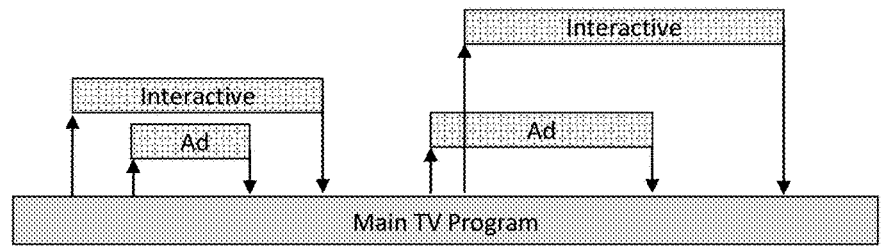
FIG. 9 (A) is a simplified diagram of a content timeline, and associated advertisements and interactive content that are presented in a parallel configuration.

FIG. 9 (A) illustrates two different scenarios for presentation of an advertisement and an interactive service associated with a main or primary program. In the first scenario (on the left side of FIG. 9(A)), ad insertion is initiated after the interactive service has started and ends while the interactive service is still being presented. In the second scenario (on the right side of FIG. 9(A)), ad insertion is initiated first, then the interactive service is started and the ad ends while the interactive service is still being presented. In both scenarios, each of these services (i.e., targeted ad and interactive service) are initiated and terminated independently of the life cycle of the other service. Once a service ends, it returns to the main program. When the main program changes (e.g., a channel change initiated by the consumer), both associated services end.

Figure 9B:
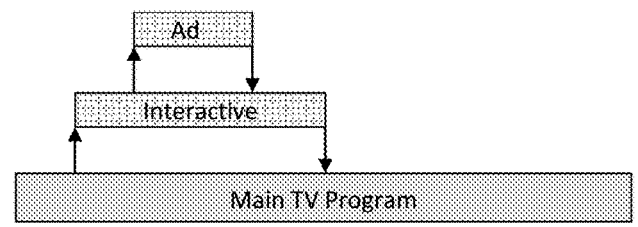
Figure 9C:
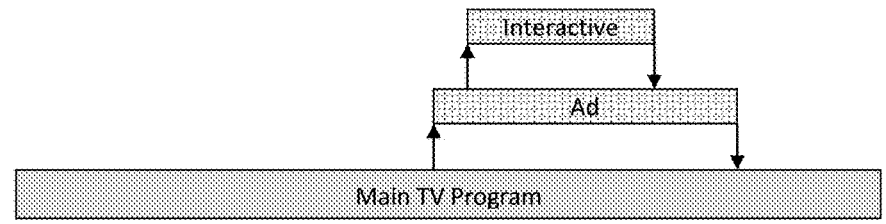

In other cases, a targeted ad may be associated with an active interactive service, or vice versa. In both cases, the interactive service and targeted ad insertion are dependent at least another service. For example, when a first service ends, the second service that is dependent on the first service also ends automatically. Again, the service signaling for both services can be delivered to the client as a single service signaling file. FIG. 9(B) illustrates a scenario for presentation of a nested advertisement that its presence depends on the associated interactive service. FIG. 9(C) illustrates a scenario for presentation of a nested interactive service that its presence depends on the associated advertisement.

Figure 10:
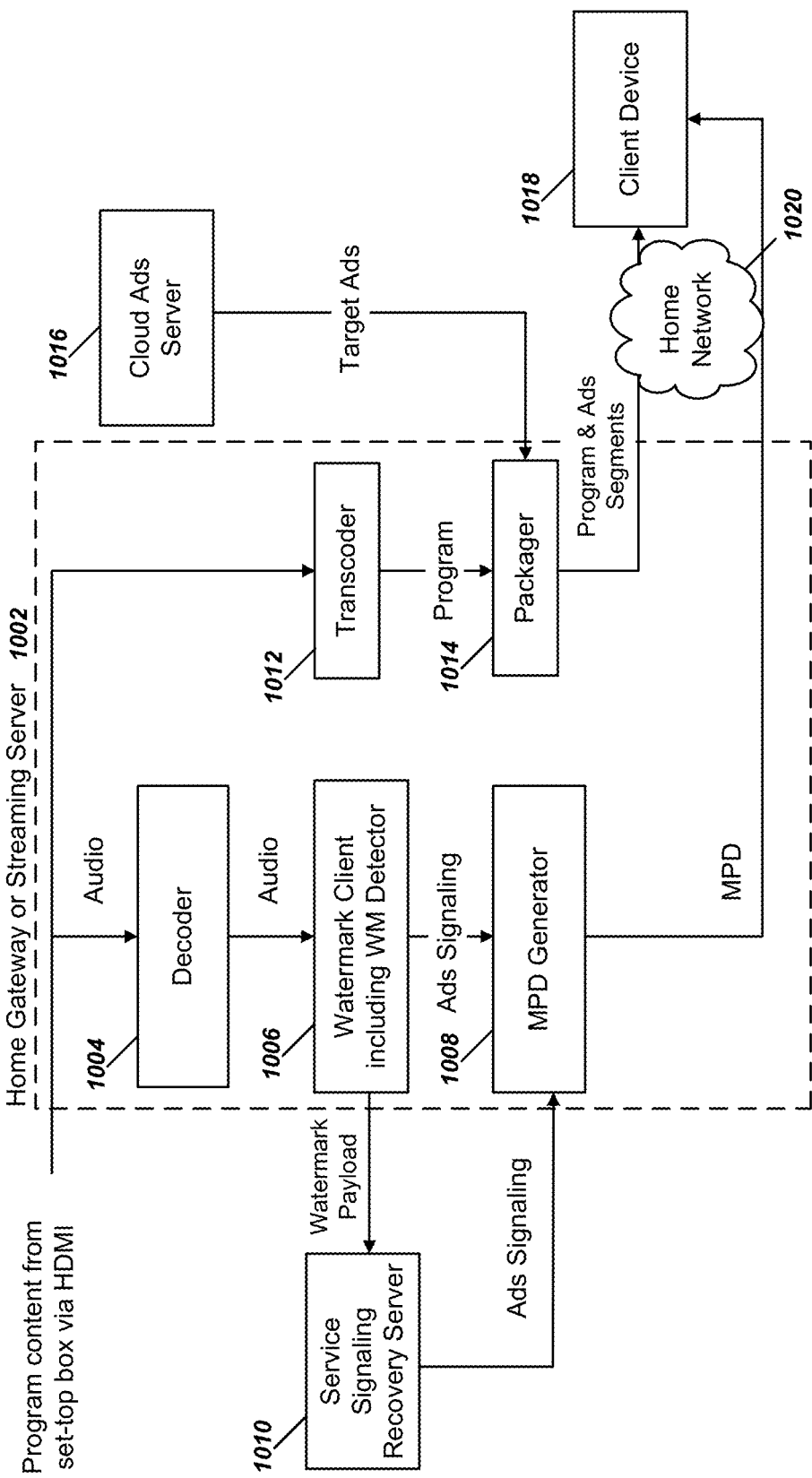
FIG. 10 illustrates a system architecture for server-side advertisement insertion after content redistribution in accordance with an exemplary embodiment.

Exemplary Server-side Targeted Ads Insertion after Redistribution:

FIG. 10 is a system architecture that enables server-side ads insertion after content redistribution for a use case where the service signaling in the main program is lost. In this case, a home streaming server (e.g., home gateway) 1002 receives the main program from a set-top box via, for example, HDMI, and streams the program through a home network 1020 to other player devices such as a tablet or a TV within a home network, collectively shown as the client device 1018. As shown in FIG. 10, watermark information is used to recover service signaling. In one exemplary scenario, the audio signal after being processed by the decoder 1004 is provided to a watermark client 1006. Once the watermark client 1006 that includes, or is coupled to, a watermark detector detects a content segment discontinuity (e.g. caused by start of a new content segment or channel change) or a query event flag, it sends a request to a service signaling recovery server 1010 (e.g., via a protocols described earlier), and receives ads signaling that enables insertion of one or more advertisements. The service signaling recovery server 1010 can be configured in the client device and/or identified using a URL resolver of service signaling recovery server based on part of the watermark information.

Once the ads signaling is recovered, targeted ads can be delivered using established protocols and methods. For example, when the ads signaling are in the form of an SCTE 35 message, the targeted ads are delivered in accordance with the SCTE standard.

FIG. 10 further illustrates another scenario where both broadcast programs and targeted ads are delivered to clients via MPEG DASH streaming protocol. The information about splicing between main program and targeted ads is determined and included in an MPD at the time when the MPD is generated. In case where the ads insertion is unknown at the time of MPD generation, DASH events on a client can be used to trigger the MPD update (as proposed by the DASH Industry). A DASH event may occur when a client reaches the expiration time of an MPD or detects a message in ISOBMFF boxes of type "emsg". Once any event occurs, the client requests for an MPD update, in which ads signaling for advertisement insertion may be added, removed, or changed.

Referring back to FIG. 10, the ads signaling is provided to an MPD generator 1008 that generates a customized MPD for each group of clients based on client profile information provided by the clients and/or built by the ads decision server based on the behavior and history of the clients. In this exemplary scenario of FIG. 10, both program and targeted ads share the same MPD generator 1008 and content segment packager 1014 that receives the main program through a transcoder 1012. The packager 1014 receives the targeted ads through a cloud ads server 1016.

Figure 11:
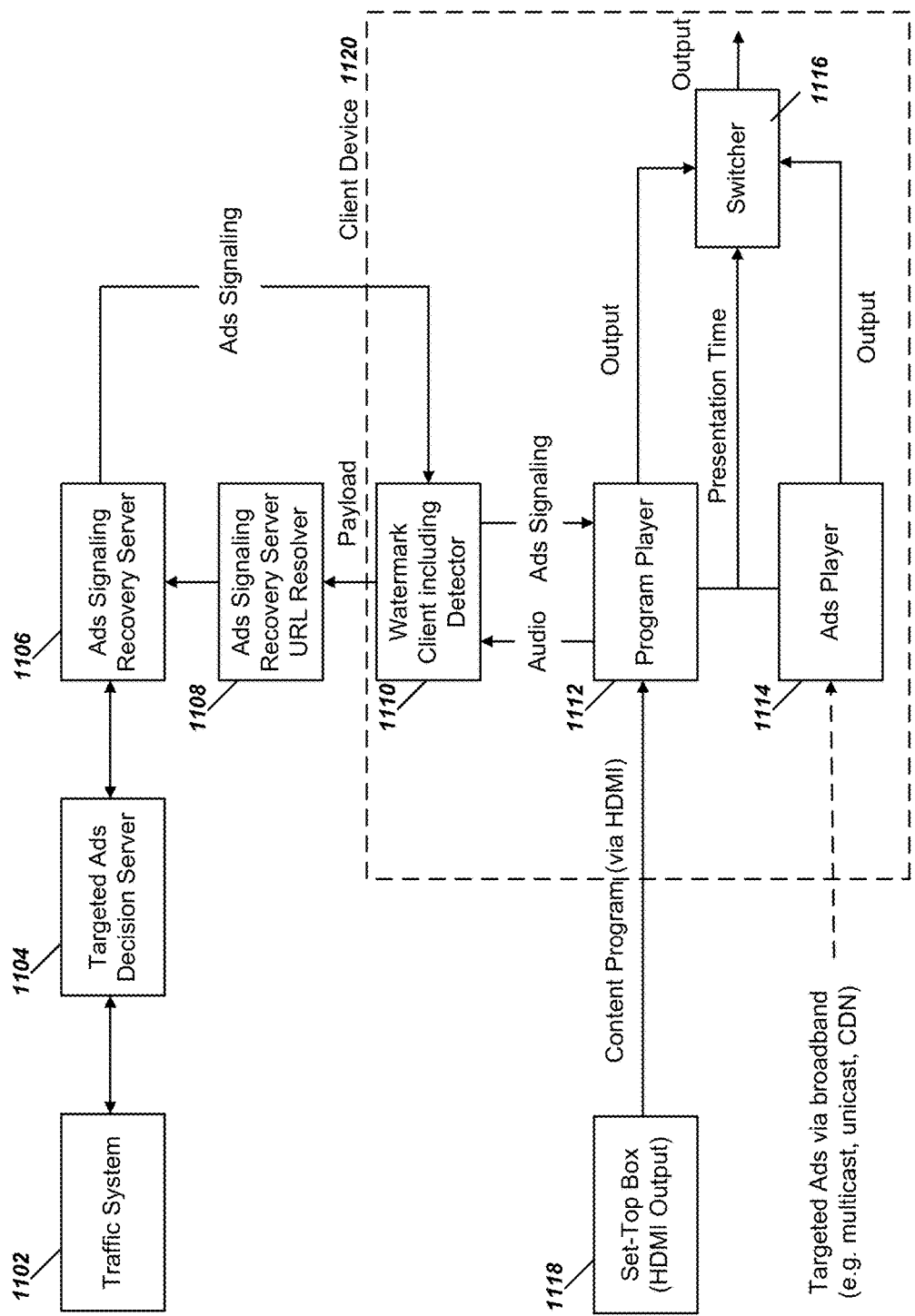
FIG. 11 illustrates a system architecture for client-side advertisement insertion after content redistribution in accordance with an exemplary embodiment.

Exemplary Client-Side Targeted Ads Insertion after Redistribution:

FIG. 11 shows an exemplary architecture for targeted advertisement insertion at the client side, using the service signaling recovered based on watermark information extracted from broadcast program. The system of FIG. 11 includes a client device 1120 which receives the main content from a set top box 1118 through, for example, an HDMI interface. The client device 1120 includes a watermark client 1110 that includes, or is coupled to, a watermark detector. The watermark client 1110 communicates with the ads signaling recovery server URL resolver 1108, which communicates with an ads signaling recovery server 1106. The ads signaling recovery server 1106 is in communication with a targeted ads decision server 1104, which is coupled to a traffic system 1102. Traffic system 1102 selects content items such as program segment and advertisements for inclusion in the broadcast service and includes those items in the broadcast service at the appropriate time on the service timeline. Prior to the airing of an advertisement in the service for which alternative targeted advertisements are also available for delivery to specific groups receivers, the traffic system 1102 may notify the targeted ads decision server 1104 of information about the scheduled advertisement and the alternative targeted advertisements. The targeted ads decision server 1104 employs this information to select appropriate alternative targeted advertisements. Information regarding the alternative targeted advertisements is transmitted by the targeted ads decision server 1104 to the ads signaling recovery server 1106. The watermark client 1110 receives the ads signaling from the ads signaling recovery server 1106.

The client device 1120 in the exemplary architecture of FIG. 11 includes two separate media players: the ads player 1114 and program player 1112 for playback of the ads and the primary program content, respectively. However, in some implementations, only a single player is provided. In the former case with two players, the switcher/splicer component 1116 switches or slices the output of the media players based on the start and end times of the targeted ads specified in ads signaling. In the latter case with only one player (not shown), the switcher/splicer is placed before the player and provides either the ads or the primary program content (typically in compressed form) to the single media player based on the same ads signaling. In either implementation, the timing of the ads insertion is specified in terms of the program's presentation time on the client device.

Obtaining Ads Signaling:

In one exemplary scenario, the watermark client component that includes, or is coupled to, a watermark detector receives the audio data from a media player that plays the main program (via a distribution source such as MVPD or Over-the-top (OTT) over HDMI interface. In some exemplary scenarios, when the watermark client component detects a content segment discontinuity or a query event flag, it sends a request to a service signaling recovery server and receives the ads signaling. Compared to the architectures that use an in-stream ads signaling, the service signaling recovered from watermarks embedded in the primary program enables faster advertisement insertion (e.g., in live broadcasts), and avoids frequent MPD updates. In the architecture shown in FIG. 11, once a decision for ads insertion is made during a live broadcast, the ads signaling of this ad insertion (including the insertion time on the program presentation timeline, ad identifiers, and ad server locations, etc.) is directly delivered to the ads signaling recovery server 1106 via broadband using, for example, Internet push technologies. Such direct delivery via broadband is usually faster than the in-stream delivery where various delays (e.g., broadcast transmissions delays) can be introduced.

Examples of Timeline for Ads Insertion:

Example 1: Use Media Player's Timers for Inserting Targeted Ads

Once the client receives the ads signaling, it sets a timeout value of a timer in the main program player according to the media presentation time of the main program. The timeout value (T1) is the difference between the current time and the actual ads insertion time specified in the ads signaling, both specified with referenced to the presentation timeline. In some embodiments, the client device uses the URL that is obtained from the ads signaling to buffer the advertisements if the ads are not locally cached. Once the timeout (T1) is reached, the main program player triggers the switcher component to (1) perform targeted ad insertion by switching the output of the ads player as the output of the client device, and (2) set a timeout value (T2) of a timer in the ads player as the duration of the ad. Once the timeout (T2) is reached, the ads player triggers the switcher component to switch the output of the client device back to the output of the main program player.

Both program player and ads player use a common presentation timeline that is based on an internal or external clock that generates accurate clock ticks with sufficient frequency. Depending on the client implementation, such clock can be an internal clock reference carried in the media stream such as Program Clock Reference (PCR), an audio sample counter, as an external clock such as an audio renderer, a timing server, a Network Time Protocol (NTP) server or a system clock.

Example 2: Use Wall Clock Timer for Inserting Targeted Ads

In an alternate embodiment, wall clock time (i.e., real time of day) is used for ads insertion is used instead of the player's presentation times. This approach can significantly simplify the interfaces between ads switcher and players, and can also allow for scheduling the ad insertion far in advance of the actual insertion time based on the broadcast schedule defined in the ads signaling and wall clock time. On the other hand, wall clock timer may not have sufficient precision for frame-accurate insertion, may not support insertion during trick plays (e.g., fast forward, rewind, etc.), and may not be suitable for video-on-demand or pre-recorded content.

Example 3: Use Watermark Timecodes for Inserting Targeted Ads

In some implementations, the watermark client provides information including the exact insertion point (e.g., with sample level granularity) to the switcher. This information can be provided based on the extracted watermark messages using the start of a watermark interval and an offset (e.g., the number of samples) from such start. In this context, examples of a sample include a video frame, an encoded audio frame, or a PCM audio sample.

Figure 12:
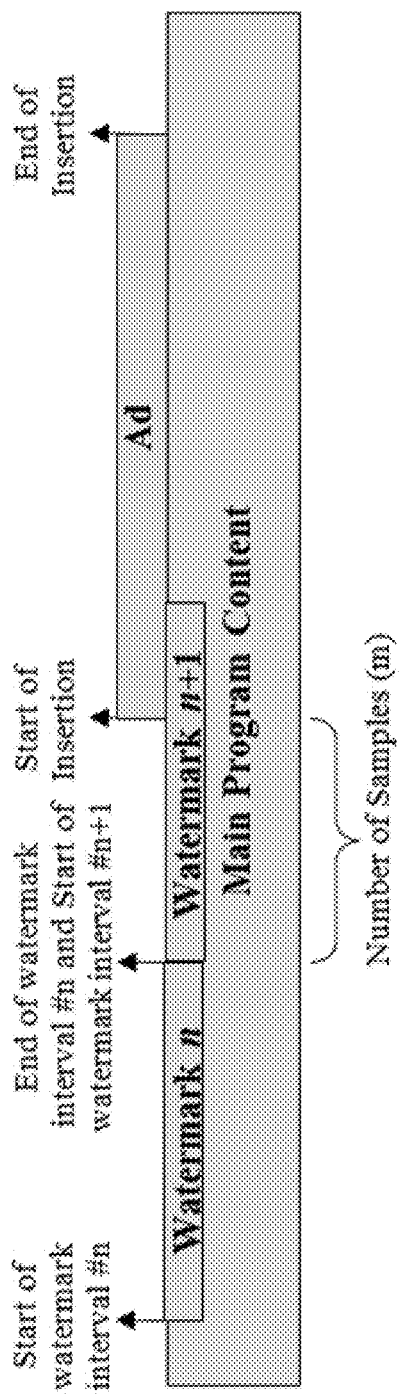
FIG. 12 is a simplified diagram of a content timeline and associated advertisements that are inserted based on information obtained from watermarks that are embedded in a main content.

FIG. 12 illustrates an example ads insertion using timing information based on the embedded watermark messages. In this example, it is assumed that an audio watermark message has a duration of 1.5 seconds. As shown FIG. 12, the insertion point of the Ad is specified by $(n \times 1.5)+m/r$, where n is the start of the last watermark interval prior to the ads insertion point, 1.5 is the duration of a watermark interval, m is the number of samples between the end of the watermark n interval and the ads insertion point, and r is the sample rate of the program content in which the watermark is originally embedded. The time instance of the insertion point is also the time of the last sample prior to insertion on the presentation timeline of the client. If the sample rate of the program being rendered is different from r, an adjustment can be made in order to calculate the start of insertion point.

Exemplary Service Signaling Update During Ads Insertion:

In a configuration of the client as shown in FIG. 11, the watermark client continuously receives the decoded audio from the program player and performs watermark detection during ads insertion or performing other broadcast services such as interactive functions. In this case, the watermark can be continuously used as a communication channel for broadcasters to update the service signaling for various purposes. Some examples using the watermark-enabled service signaling update include: (a) terminating a service earlier than scheduled; (b) terminate one service and start another service; or (c) resume a service after the end of another service.

An example of how to use a watermark-enabled service signaling update to terminate ads insertion is described below. In this example, ads signaling includes the duration and/or ending time of an ad insertion. In addition, it is also possible to use a watermark flag that either generates a query event for an ads signaling update from a service signaling recovery server, or is embedded directly in the program for signaling termination of an ads insertion. Once a decision for early termination of an ads insertion is made (e.g., at the broadcaster end), a specific watermark flag is embedded in the main program. If the flag generates a query event, the ads signaling at the ads signaling recovery server is updated immediately so that such updated ads signaling provides the client device with instructions when to terminate the ad insertion after the client receives the updated ads signaling.

Continuing with the above example, once the watermark client detects such watermark flag or receives an ads signaling update indicating immediate terminate of the ads insertion, the watermark client provides a corresponding message or signal to switcher component to cause the program that is output from the client device to switch to the immediately switch from the ads player to the program player. Using a watermark flag enables the switcher to switch to the main program earlier than the scheduled time (e.g., defined either by ending time or duration). Further, such a mechanisms provides additional real-time signaling to terminate ads insertion for use cases such as unexpected start or end of a live content.

In some embodiments, the program player does not receive the main program, or alternatively suspends processing the main program, during the ads insertion. As a result, in these scenarios, the watermark client will not receive the audio from the program player during ads insertion. In this case, the option to terminate an ad using the watermark flag can be disabled.

Exemplary Considerations for Ads Insertion Decision by Server or Client:

Client devices can be identified by cookies or IP addresses when they request for service signaling. The preference and profile of each client can be stored in service signaling recovery server (or a separate targeted ads decision server coupled to the service signaling recovery server) and/or at the client device. The targeted ads decision server can create service signaling files for each target category based on clients' preferences and profiles, and ads inventory.

In one embodiment, the targeted ads decision is made by the service signaling recovery server based on the identification of a client (e.g., using the unique ID stored as a cookie on the client). Once a client requests for service signaling, the server selects and delivers an ads signaling file associated with specific ads that match the profile of the client for each ads insertion point.

In another embodiment, the service signaling recovery server returns an ads signaling file with information regarding all possible ads, independent of clients' profiles, for each ads insertion point. In this case, the client can use locally-stored preferences file(s) to select one of the ads for each insertion point.

In another embodiment, a hybrid approach provides flexibility for both the server and the client. In this hybrid method, the service signaling recovery server can first select and return ads based on client's profile stored on the server, and the client can further use the locally stored preference to select one of the ads for each insertion point.

Figure 13:
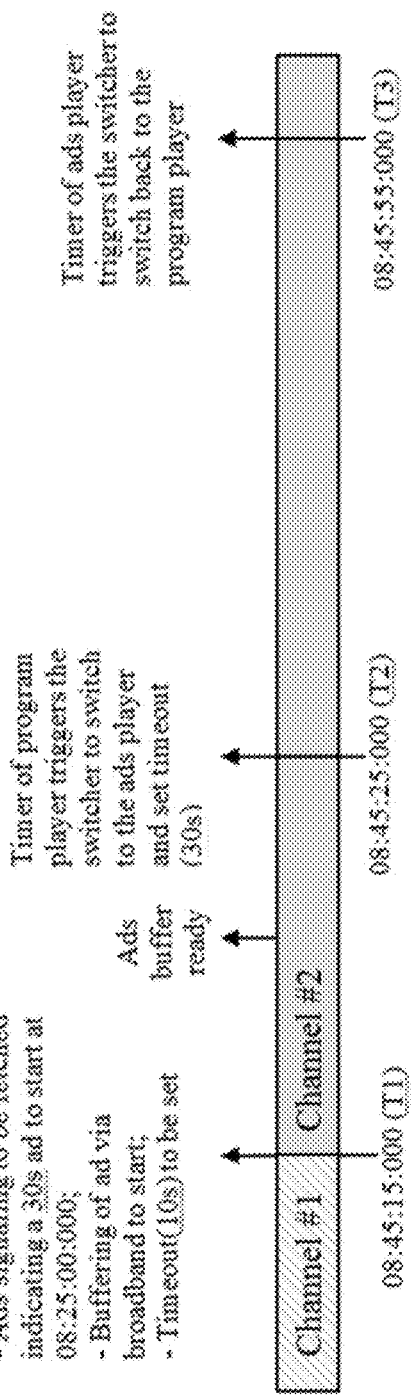
FIG. 13 is a simplified diagram of a content timeline and associated operations that can be conducted to enable presentation of an advertisement upon occurrence of a channel change in accordance with an exemplary embodiment.

Additional Ads Insertion Examples:

FIG. 13 shows an example of a client-side ads insertion. When the user switches to a new channel (e.g., from Channel #1 to Channel #2) at T1, the watermark client is activated to send a query to a service signaling recovery server to fetch ads signaling, start buffer the ad that is to be presented (e.g., at 08::25:00:000), and set a timeout (e.g., 10 seconds) corresponding to the start time of the ad. At T2, the switcher receives a timeout event from the main program player and it makes a switch to the ads player. At the same time, the ads player sets a timeout (e.g., 30 seconds) that corresponds to the duration of the ad. At T3, the switcher receives a timeout event from the ads player and then it makes a switch back to the main program player.

Several events may happen between T1 and T3 as follows. (1) If the user switches to a new channel between T1 and T2 (e.g., Channel 3—not shown) prior to the ads insertion, the scheduled ads insertion may be cancelled. (2) If the user switches to a new channel during playback of the ads (i.e., between T2 and T3), the switcher may switch to the main program player (i.e., the program of the new channel), and terminate the ads player. (3) During playback of the ads (i.e., between T2 and T3), a scheduled interactive service that is associated with the ads (as shown in FIG. 9(B)) is launched by the client's interactive service function. When the ads end, the switcher terminates the interactive service or informs the interactive service function to terminate the interactive service (if it has not already ended). (4) Between T1 and T3, an interactive service that is associated with Channel #2 is launched as an overlap on either the main program or the ads. In this case, both interactive service and the ad can be presented in parallel is shown in FIG. 9(A), and end independently.

Figure 14:
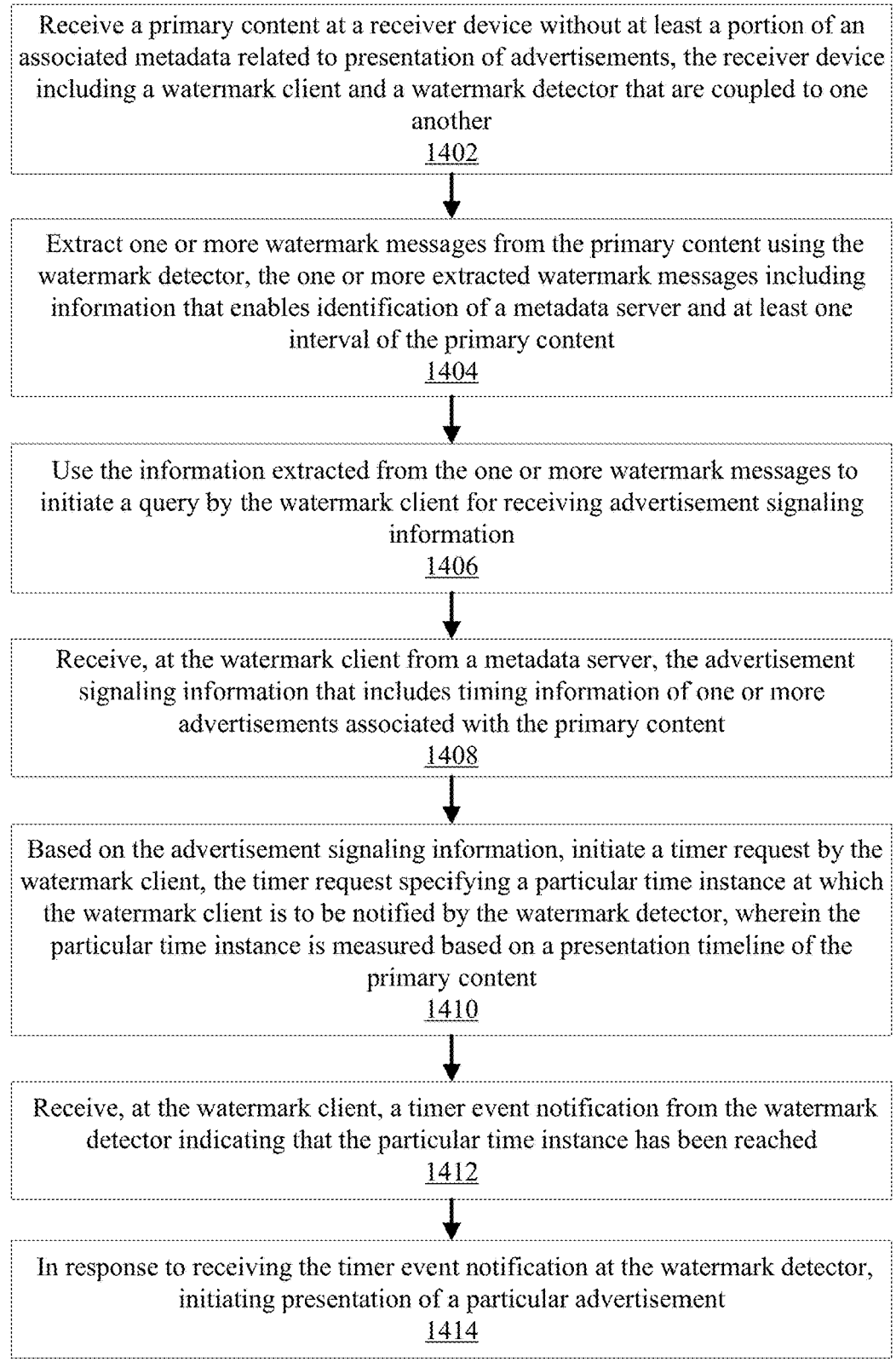
FIG. 14 illustrates a set of exemplary operations that can be carried out for presentation of an advertisement associated with a primary content in accordance with an exemplary embodiment.

FIG. 14 illustrates a set of operations that can be carried out method for presentation of an advertisement associated with a primary content in accordance with an exemplary embodiment. At 1402, the primary content is received at a receiver device without at least a portion of an associated metadata related to presentation of advertisements. The receiver device includes a watermark client and a watermark detector that are coupled to one another. At 1404, one or more watermark messages are extracted from the primary content using the watermark detector. The one or more extracted watermark messages include information that enables identification of a metadata server and at least one interval of the primary content. At 1406, using the information extracted from the one or more watermark messages, a query is initiated by the watermark client for receiving advertisement signaling information. At 1408, the advertisement signaling information is received at the watermark client from a metadata server. The advertisement signaling information includes timing information of one or more advertisements associated with the primary content. At 1410, based on the advertisement signaling information, a timer request is initiated by the watermark client. The timer request specifies a particular time instance at which the watermark client is to be notified by the watermark detector, where the particular time instance is measured based on a presentation timeline of the primary content. At 1412, a timer event notification is received at the watermark client from the watermark detector indicating that the particular time instance has been reached. At 1414, in response to receiving the timer event notification at the watermark detector, presentation of a particular advertisement at the particular time instance is initiated.

In one exemplary embodiment, the method of FIG. 14 further includes, subsequent to initiating the query, receiving and buffering the particular advertisement's content from a communication network coupled to the receiver device. The communication network, in one embodiment, is a broadband communication network. In another embodiment, receiving the primary content includes receiving the primary content through a high-definition multimedia interface (HDMI) interface of the receiver device. In yet another exemplary embodiment, he receiver device is one of a television set, a tablet, a mobile phone or a personal computer.

According to another embodiment, the receiver device includes a program player, an advertisement player and a switcher, and initiating presentation of the particular advertisement comprises using the switcher to route the output of the advertisement player to an output of the receiver device.

In another exemplary embodiment, the receiver device is one of a home gateway or a streaming server that receives the primary content, the advertisement signaling information and the particular advertisement's content, and transmits the primary program in addition to the particular advertisement's content to a client device for presentation. In one embodiment, the client device is one of a television set, a tablet, a mobile phone or a personal computer. In another embodiment, the home gateway or a streaming server includes media presentation description (MPD) generator, and information regarding splicing between the primary and the particular advertisement is included in an MPD by the MPD generator and transmitted to the client device.

According to another embodiment, the particular advertisement is a targeted advertisement that is selected based on one or more of: a viewer's preferences, a viewer's location, a receiver device's internet protocol (IP) address, a time at which the primary content is being viewed, a viewer's demographics, psychographic factors, or a viewer's past activities. In yet another exemplary embodiment, the information extracted from the one or more watermark messages that enables identification of a metadata server includes a server code and an interval code, and the query is initiated upon a determination that at least the server code differs from a previously extracted server code. In yet another exemplary embodiment, the query is initiated upon a detection of a channel change of the primary program.

In one exemplary embodiment, the watermark detector receives an audio portion of the primary content, and extracting the one or more watermark messages includes extracting the one or more watermark message from the audio portion. In this embodiment, an insertion point of the particular advertisement is specified by (n×L)+m/r, where n is a start location of a last complete watermark message prior to the insertion point of the particular advertisement, L is duration of each of the one or more watermark messages, m is a number of samples between an end location of watermark n and the insertion point of the particular advertisement, and r is a sample rate of the primary content.

Figure 15:
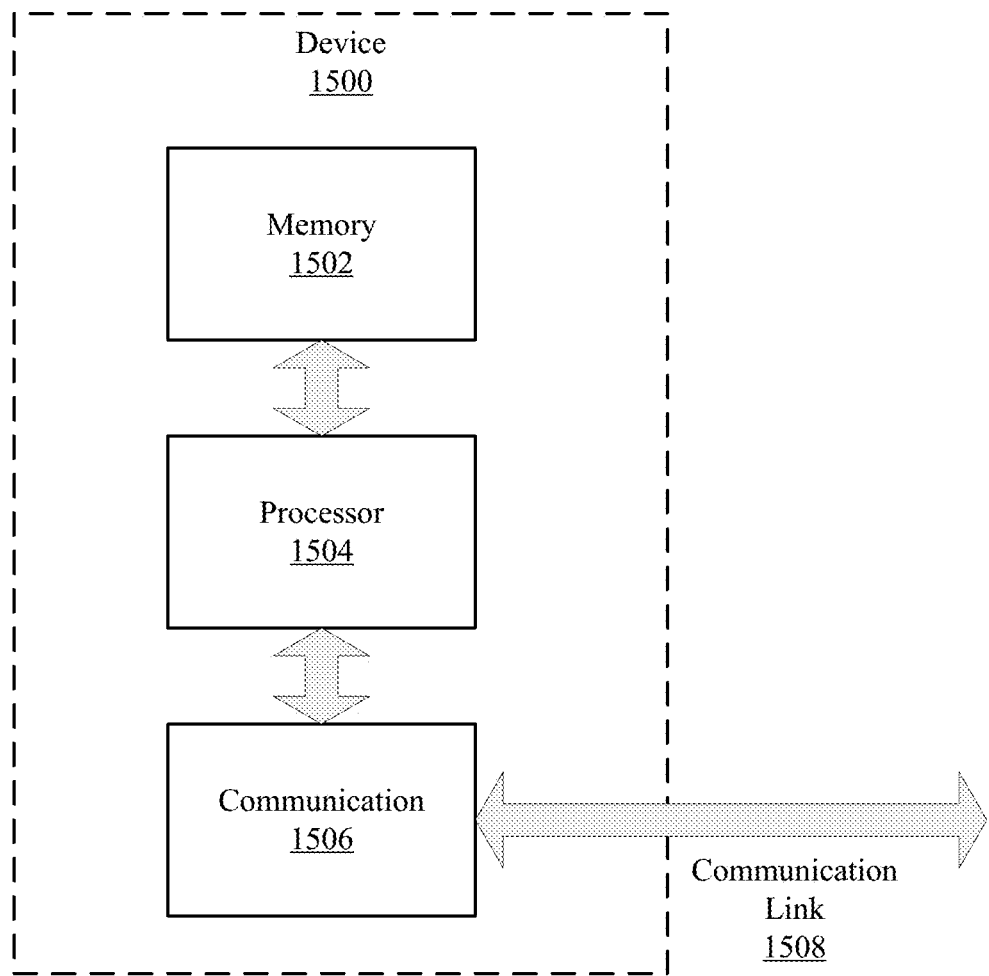
FIG. 15 illustrates a block diagram of a device that can be used for implementing various disclosed embodiments.

FIG. 15 illustrates a block diagram of a device 1500 within which various disclosed embodiments may be implemented. The device 1500 comprises at least one processor 1504 and/or controller, at least one memory 1502 unit that is in communication with the processor 1504, and at least one communication unit 1506 that enables the exchange of data and information, directly or indirectly, through the communication link 1508 with other entities, devices, databases and networks. The communication unit 1506 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 1500 of FIG. 15 may be integrated as part of any devices or components described in this document to carry out any of the disclosed methods.

The components or modules that are described in connection with the disclosed embodiments can be implemented as hardware, software, or combinations thereof For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products, as well as in different sequential orders. Any embodiment may further be combined with any other embodiment.

What is claimed is:

1. A method for reporting usage information associated with a content, comprising:
extracting one or more watermark messages that are embedded in a content to obtain a server code and an interval code, the one or more watermark messages extracted at a receiver device using a watermark extractor that it implemented at least partially in electronic circuits;
initiating a transmission to a metadata server that includes at least in-part the server code and the interval code;
receiving service recovery information associated with the content, the service recovery information including information associated with a usage monitoring operation;
initiating a transmission to a service function server in accordance with the usage monitoring operation obtained from the service recovery information, wherein the transmission to the service function server includes content usage monitoring information indicative of a change of the content and a time value associated with the change of the content.

2. The method of claim 1, wherein the transmission to the service function server is triggered in response to detection of a change of the content.

3. The method of claim 1, wherein the change of the content includes a change of the content's rendering timeline.

4. The method of claim 3, wherein the change of the content's rendering timeline is indicative of one or more of:
a change to a different content;
a skip forward in the timeline of the content; or
a skip backward in the timeline of the content.

5. The method of claim 1, wherein the transmission to the service function server is triggered in response to receiving a poll.

6. The method of claim 1, wherein the transmission to the service function server is triggered based on a timed event that identifies the usage monitoring operation to be performed at a corresponding instant in time as the content is being presented by the receiver device.

7. The method of claim 6, wherein the information corresponding to the timed event is obtained from the service recovery information comprising a plurality of timed events, wherein each timed event is associated with a time at which the corresponding timed event is scheduled to occur.

8. The method of claim 1, wherein the transmission to the service function server includes an indication as to whether or not a watermarked segment of the content is received by the receiver device.

9. The method of claim 1, wherein the transmission to the service function server is carried out based on a service identifier that identifies a service associated with the content.

10. The method of claim 1, wherein the transmission to the service function server includes timing information associated with one or more boundaries of the one or more watermark messages.

11. The method of claim 1, wherein the transmission to the service function server includes one of a service message or a service file that includes data elements encapsulated in a file of a prescribed format.

12. The method of claim 1, wherein the transmission to the service function server includes a watermark state indicator including one or more of an inactive state, an active state or a gap state.

13. A method for receiving usage information associated with a content, comprising:
   extracting one or more watermark messages that are embedded in a content to obtain a server code and an interval code, the one or more watermark messages extracted at a receiver device using a watermark extractor that it implemented at least partially in electronic circuits;
   initiating a transmission from the receiver device to a metadata server that includes the server code and the interval code;
   receiving, at the user device, service recovery information associated with the content, the service recovery information including information associated with a usage monitoring operation;
   initiating a transmission from the receiver device to a service function server in accordance with the usage monitoring operation; and
   receiving, at a service function server from the receiver device, content usage monitoring information including an indication of a change of the content and a time value associated with the change of the content.

14. A method for receiving usage information associated with a content, comprising:
   embedding a plurality of watermark messages in a content, one or more of the watermark messages including a sever code and an interval code, the one or more watermark messages embedded at a broadcaster device using a watermark embedder that it implemented at least partially in electronic circuits, the server code and the interval code enabling identification of a metadata server comprising service recovery information associated with the content, the service recovery information including information associated with a usage monitoring event;
   receiving a request at the metadata server for service recovery information from a client device;
   transmitting the service recovery information to the client device including information associated with a usage monitoring event; and
   receiving, at a service function server from the client device, content usage monitoring information including an indication of a change of the content and a time value associated with the change of the content.

15. A method for receiving usage information associated with a content that includes a plurality of watermark messages, the method comprising:
   receiving a request at a metadata server for service recovery information associated with a content, the request produced by a client device based on detection of watermark messages that are embedded in the content, wherein one or more of the watermark messages includes a server code that enables identification of the metadata server and an interval code that enables identification of the service recovery information, the service recovery information including information identifying a usage monitoring service server;
   transmitting the service recovery information including information associated with a usage monitoring event to the client device; and
   receiving, at the usage monitoring service server from the client device, content usage monitoring information including an indication of a change of the content and a time value associated with the change of the content.

16. A device, comprising:
   a processor; and
   a memory including processor executable code, the processor executable code when executed by the processor causes the device to:
   receive a content a the device;
   extract one or more watermark messages that are embedded in the content to obtain a server code and an interval code;
   initiate a transmission to a metadata server that includes the server code and the interval code;
   receive service recovery information associated with the content, the service recovery information including information associated with a usage monitoring operation;
   initiate a transmission to a service function server in accordance with the usage monitoring operation obtained from the service recovery information, wherein the transmission to the service function server includes content usage monitoring information indicative of a change of the content and a time value associated with the change of the content.

17. The device of claim 16, wherein the transmission to the service function server is triggered in response to detection of a change of the content.

18. The device of claim 16, wherein the change of the content includes a change of the content's rendering timeline.

19. The device of claim 18, wherein the change of the content's rendering timeline is indicative of one or more of:
   a change to a different content;
   a skip forward in the timeline of the content; or
   a skip backward in the timeline of the content.

20. The device of claim 16, wherein the transmission to the service function server is triggered in response to receiving a poll.

21. The device of claim 16, wherein the transmission to the service function server is triggered based on a timed event that identifies the usage monitoring operation to be performed at a corresponding instant in time as the content is being presented by the receiver device.

22. The device of claim 21, wherein the information corresponding to the timed event is obtained from the service recovery information comprising a plurality of timed events, wherein each timed event is associated with a time at which the corresponding timed event is scheduled to occur.

23. The device of claim 16, wherein the transmission to the service function server includes an indication as to whether or not a watermarked segment of the content is received by the receiver device.

24. The device of claim 16, wherein the transmission to the service function server is carried out based on a service identifier that identifies a service associated with the content.

25. The device of claim 16, wherein the transmission to the service function server includes timing information associated with one or more boundaries of the one or more watermark messages.

26. The device of claim 16, wherein the transmission to the service function server includes one of a service message or a service file that includes data elements encapsulated in a file of a prescribed format.

27. The device of claim 16, wherein the transmission to the service function server includes a watermark state indicator including one or more of an inactive state, an active state or a gap state.

28. A computer program product, embodied on a non-transitory computer readable medium, comprising instructions for reporting usage information associated with a content, comprising:
  program code for extracting one or more watermark messages that are embedded in a content to obtain a server code and an interval code;
  program code for initiating a transmission to a metadata server that includes at least in-part the server code and the interval code;
  program code for receiving service recovery information associated with the content, the service recovery information including information associated with a usage monitoring operation; and
  program code for initiating a transmission to a service function server in accordance with the usage monitoring operation obtained from the service recovery information, wherein the transmission to the service function server includes content usage monitoring information indicative of a change of the content and a time value associated with the change of the content.

* * * * *